(12) United States Patent
Carlsson

(10) Patent No.: US 6,256,308 B1
(45) Date of Patent: Jul. 3, 2001

(54) MULTI-SERVICE CIRCUIT FOR TELECOMMUNICATIONS

(75) Inventor: Dan Carlsson, Hasselby (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/009,535

(22) Filed: Jan. 20, 1998

(51) Int. Cl.[7] ............... H04L 12/28; H04J 3/16; H04J 3/04
(52) U.S. Cl. ............. 370/395; 370/465; 370/535
(58) Field of Search .................. 370/463, 465, 370/395, 352, 386, 419, 466, 467, 535, 474, 414, 400, 401, 402, 351

(56) References Cited

U.S. PATENT DOCUMENTS

| | | |
|---|---|---|
| 4,926,416 | 5/1990 | Welk . |
| 5,280,476 | 1/1994 | Kojima et al. . |
| 5,327,428 | 7/1994 | Van As et al. . |
| 5,361,252 | 11/1994 | Sällberg et al. . |
| 5,394,395 | 2/1995 | Nagai et al. . |
| 5,396,492 | 3/1995 | Lien . |
| 5,400,337 | 3/1995 | Munter . |
| 5,467,347 | 11/1995 | Petersen . |
| 5,481,544 | 1/1996 | Baldwin et al. . |
| 5,533,009 | 7/1996 | Chen . |
| 5,563,885 | 10/1996 | Witchey . |
| 5,570,362 | 10/1996 | Nishimura . |
| 5,581,551 | 12/1996 | Fundneider et al. . |
| 5,608,731 | 3/1997 | Upp et al. . |
| 5,619,499 | 4/1997 | Nakabayashi . |
| 5,619,500 * | 4/1997 | Hiekali ............... 370/414 |
| 5,623,493 * | 4/1997 | Kagemoto ............ 370/535 |
| 5,627,501 | 5/1997 | Biran et al. . |
| 5,636,215 | 6/1997 | Kubo et al. . |
| 5,668,798 | 9/1997 | Toubol et al. . |
| 5,715,239 * | 2/1998 | Hyodo et al. ......... 370/248 |
| 5,734,652 | 3/1998 | Kwok . |
| 5,757,771 | 5/1998 | Li et al. . |
| 5,805,591 * | 9/1998 | Naboulsi ............... 370/395 |
| 5,809,021 * | 9/1998 | Diaz et al. ............ 370/364 |

(List continued on next page.)

FOREIGN PATENT DOCUMENTS

| | | |
|---|---|---|
| 0 596 624 A2 | 5/1994 | (EP) . |
| 0 707 430 A2 | 4/1996 | (EP) . |
| 0 772 369 A2 | 5/1997 | (EP) . |
| WO 95/32596 | 11/1995 | (WO) . |
| 98/45976 | 10/1998 | (WO) . |

OTHER PUBLICATIONS

ATM Forum Technical Committee, "Utopia, An ATM–PHY Interface Specification", Level 2, Version 1.0, af–phy–0039.000, Jun. 1995, pp. 1–66.

Gobl et al; "ARIDEM a Multi–Service Broadband Access Demonstrator", ISSLS 96, 11th International Symposium on Subscriber Loops and Services, Melbourne, Feb. 4–9, 1996, no. SYMP. 11, Feb. 4, 1996, pp. 305–310, XP000698338, Institution of Radio and Electronics Engineers Australia.

Primary Examiner—Wellington Chin
Assistant Examiner—Steven Nguyen
(74) Attorney, Agent, or Firm—Nixon & Vanderhye P.C.

(57) ABSTRACT

A multi-service integrated hardware circuit (20) transmits cells between an external interface (62) and plural on-board service devices (70$_1$, 70$_2$, 72, and 74) handling differing telecommunication services. The on-board service devices include one or more ATMF transceivers (70$_1$, 70$_2$), a Utopia 2 level device (74), and a circuit emulator (72) which interfaces with one of a PCM interface (30$_1$, 30$_2$) and an E1 or TI interface (32). The multi-service circuit comprises a multiplexer/demultiplexer core (60) which connects to the external interface (62) and which connects via an internal interface (64) to the plural service devices. In the illustrated embodiments, the external interface (62) and internal interface (64) are Utopia level 2 interfaces.

11 Claims, 18 Drawing Sheets

U.S. PATENT DOCUMENTS

| | | | |
|---|---|---|---|
| 5,822,321 | * 10/1998 | Petersen et al. | 370/474 |
| 5,872,769 | 2/1999 | Caldara et al. . | |
| 5,889,773 | * 3/1999 | Stevenson, III | 370/352 |
| 5,894,477 | * 4/1999 | Brueckheimer et al. | 370/353 |
| 5,982,772 | * 11/1999 | Oskouy | 370/395 |
| 6,097,736 | * 8/2000 | Proctor et al. | 370/480 |
| 6,118,777 | * 9/2000 | Sylvain | 370/395 |

* cited by examiner

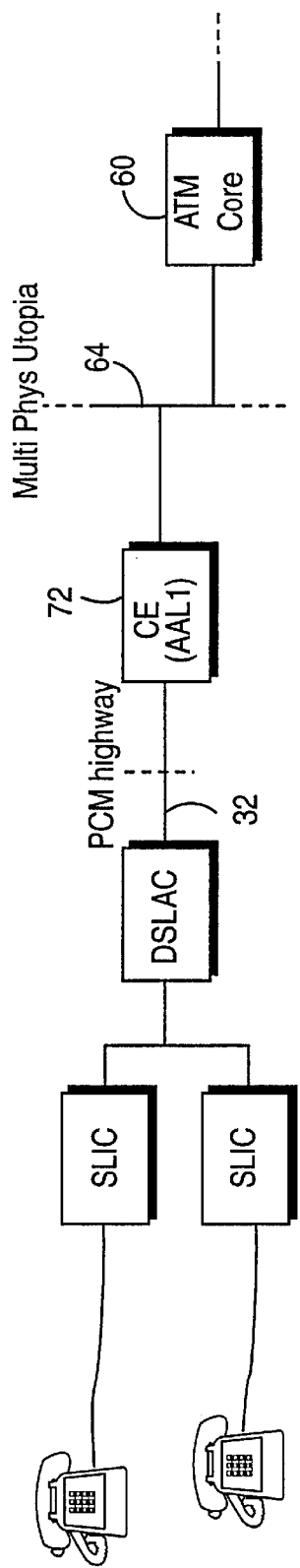
Fig. 6
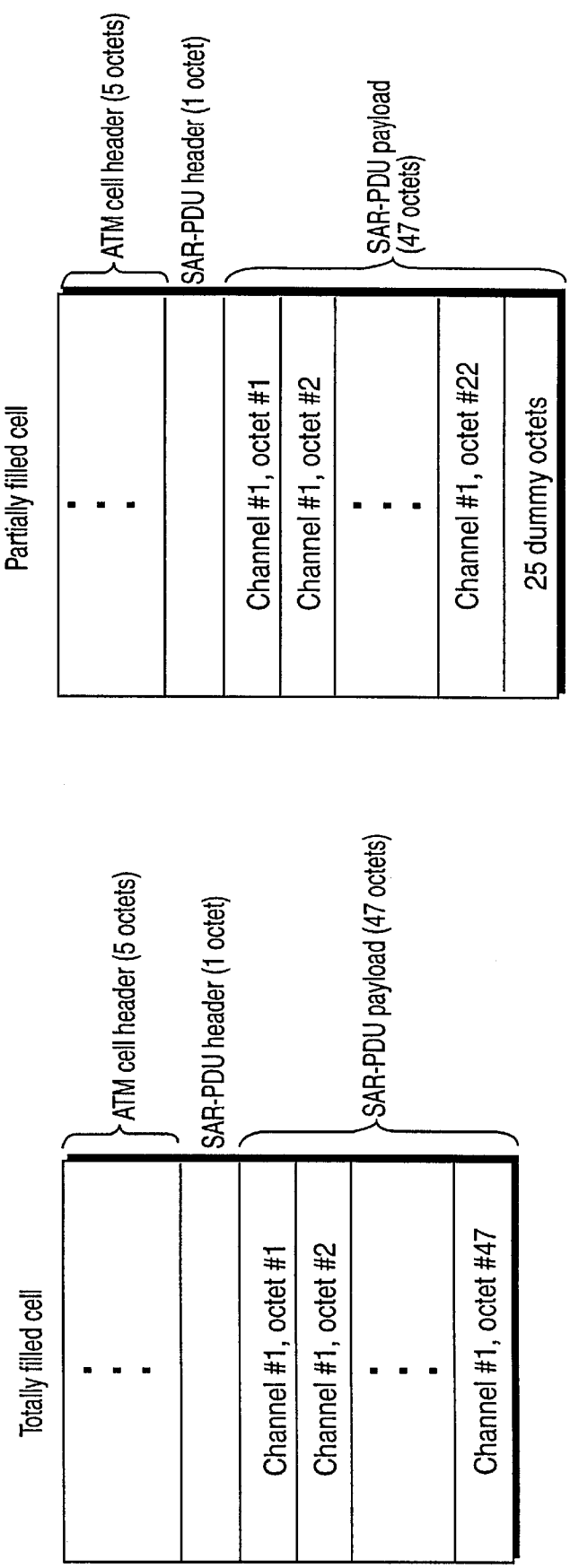
Fig. 6B(2)
Fig. 6B(1)

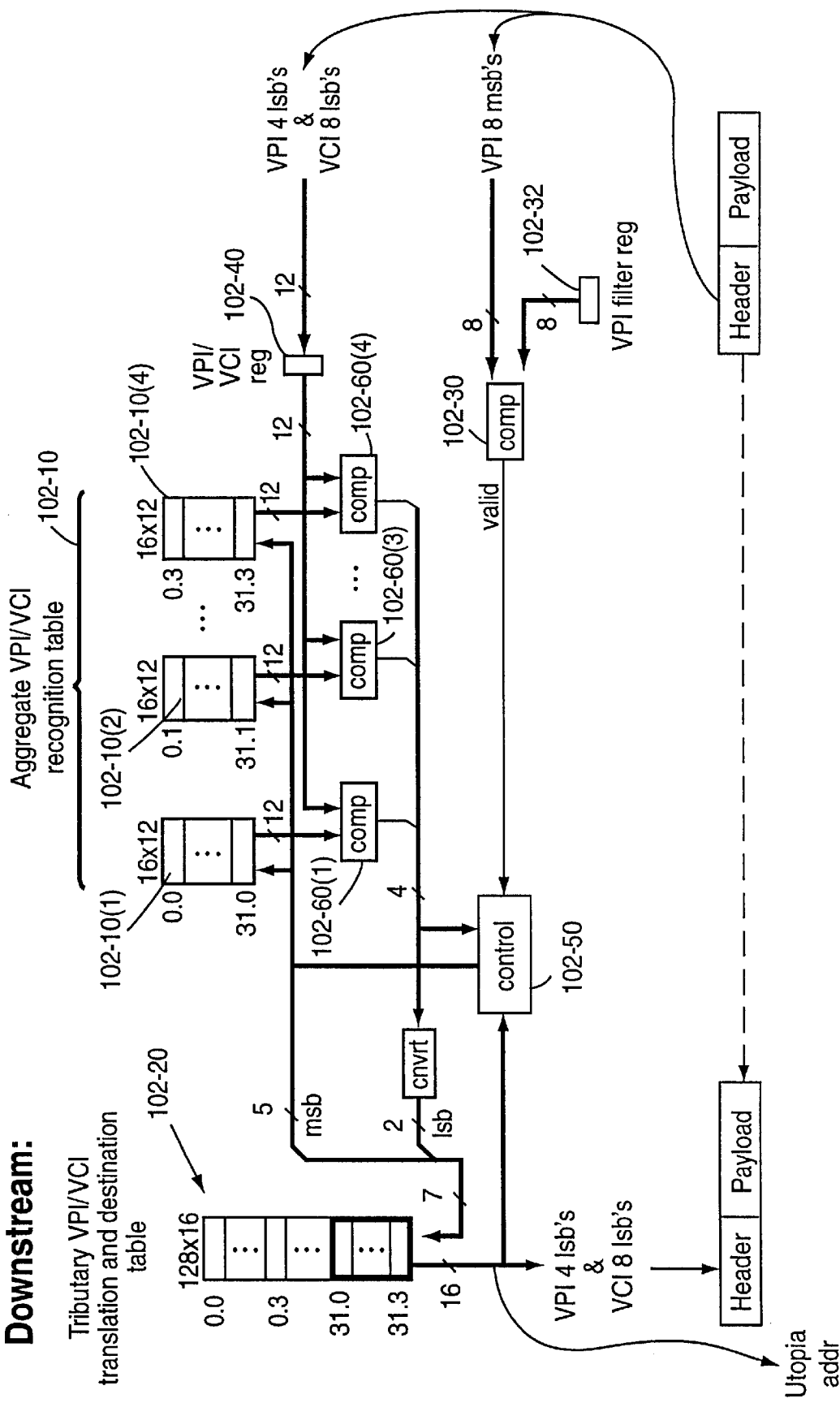

MULTI-SERVICE CIRCUIT FOR TELECOMMUNICATIONS

BACKGROUND

1. Field of the Invention

The present invention pertains to telecommunications, and particularly the provision of multiple services supplied over an external network physical interface.

2. Related Art and other Considerations

It is now desirable to provide multiple services using a single telecommunications network. For example, differing services such as video, voice telephony, data, and other interactive and/or multimedia services can be carried together over a physical medium, e.g., an external network physical interface.

One example of such an external network physical interface capable of carrying integrated multiple services system is a hybrid fiber-coax (HFC) network. In a HFC network, a headend office receives signals from various sources (e.g., analog television, Internet access, digital video on-demand) and distributes an optical signal carrying these various signals to distribution centers or nodes. At the distribution centers the optical signal is converted and re-distributed to network interface units (NIU) or network terminals (NTs) which reside at customer premises. The network interface units receive the HFC signal using an internal transceiver (e.g., modem), and distribute the appropriate channels to televisions, personal computers, and telephones, etc.

Other types of external network physical interfaces are also emerging. Such other types of external network physical interfaces include, for example, Fiber-To-The-Home (FTTH) networks and Megabit-Speed Digital Subscriber Line (xDSL) networks. The xDSL networks employ dedicated telephone lines.

Apart from the type of external network physical interfaces, there is also the consideration of network protocol interface. One popular network protocol interface is Asynchronous Transfer Mode (ATM). ATM is a packet-oriented transfer mode which uses asynchronous time division multiplexing techniques. Packets are called cells and have a fixed size. An ATM cell consists of 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual is a principal path defined between two switching nodes of the network; the virtual channel is one specific connection on the respective principal path.

Many formats and interfaces for ATM technology have been standardized. For example, ATM has several "adaptation layers" which have been the subject of ITU standardization. In addition, an ATM interface known as "Utopia level 2" has been standardized, as set forth in The ATM Forum, Technical Committee, Utopia Level 2, Version 1.0, afphy-0039.000, June 1995.

In multi-service environments, the network interface units should be flexible for accommodating not only existing services, but additional other services and other types of external network physical interfaces as well.

Some network interface units use processor cores with complementary hardware blocks. For example, the Motorola 860SAR circuit has a control processor core, an SAR processor core which is customized to handle ATM SAR functions (e.g., AAL5), and an ethernet controller that handles ethernet functions.

Processor-based network interface units are flexible for the user because the user can easily modify the functionality by changing the software executed by the processor(s). However, processor-based network interface units also have disadvantages. One disadvantage is that main functionality has to be implemented in software by the user, which can be difficult and require extreme design effort. A second disadvantage is a limited data rate attainable with processor-based units. A third disadvantage is significant power consumption.

What is needed therefore, and an object of the present invention, is a predominately hardware-based network interface unit which is flexible and efficient.

BRIEF SUMMARY OF THE INVENTION

A multi-service integratedcircuit transmits cells between an external interface and plural on-board service devices handling differing telecommunication services. The on-board service devices include one or more ATMF transceivers, a Utopia 2 level device, and an emulator which interfaces with one of a PCM interface; an E1 interface; and a T1 interface. The multi-service circuit comprises a multiplexer/demultiplexer core which connects to the external interface and which connects via an internal interface to the plural service devices. In the illustrated embodiments, the external interface and internal interface are Utopia level 2 interfaces.

The multiplexer/demultiplexer has a downstream side for transmitting cells from the external interface to the service devices and an upstream side for transmitting cells from the service devices to the external interface. The downstream side has a downstream demultiplexer and a downstream multiplexer; as well as a downstream loop-back buffer for storing cells routed from the downstream side to the upstream side. The upstream side has an upstream multiplexer and an upstream demultiplexer, as well as an upstream loop-back buffer for storing cells routed from the upstream side to the downstream side.

On the downstream side, the downstream demultiplexer serves to route cells received from the external interface to one of the downstream loop back buffer, a processor, and an input of the downstream multiplexer. The downstream multiplexer serves to obtain cells from one of the downstream demultiplexer, the upstream loop-back buffer, and the processor for transmission to the service devices via the internal interface.

On the upstream side, the upstream demultiplexer serves to route cells received from the service devices and from the processor to one of the upstream loop-back buffer, the processor, and a buffering section situated between the upstream demultiplexer and the upstream multiplexer. The upstream multiplexer serves to obtain cells from one of the buffering section and the downstream loop-back buffer for application to the external interface.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 6 is a schematic view showing connection of a circuit emulation (CE) device included in the multi-service circuit of FIG. 1.

FIG. 6B(1) is a diagrammatic view showing cell packetization performed by the circuit emulation (CE) device of FIG. 6, and particularly a totally filled cell for a structured 64 kbps channel.

FIG. 6B(2) is a diagrammatic view showing cell packetization performed by the circuit emulation (CE) device of FIG. 6, and particularly a partially filled cell for a structured 64 kbps channel.

FIG. 17A and FIG. 17B are schematic views of VPI/VCI tables for a demultiplexer and translator and a downstream multiplexer, respectively, of the ATM core of FIG. 2.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

1.0 Multi-service Circuit Overview

Figure 1:
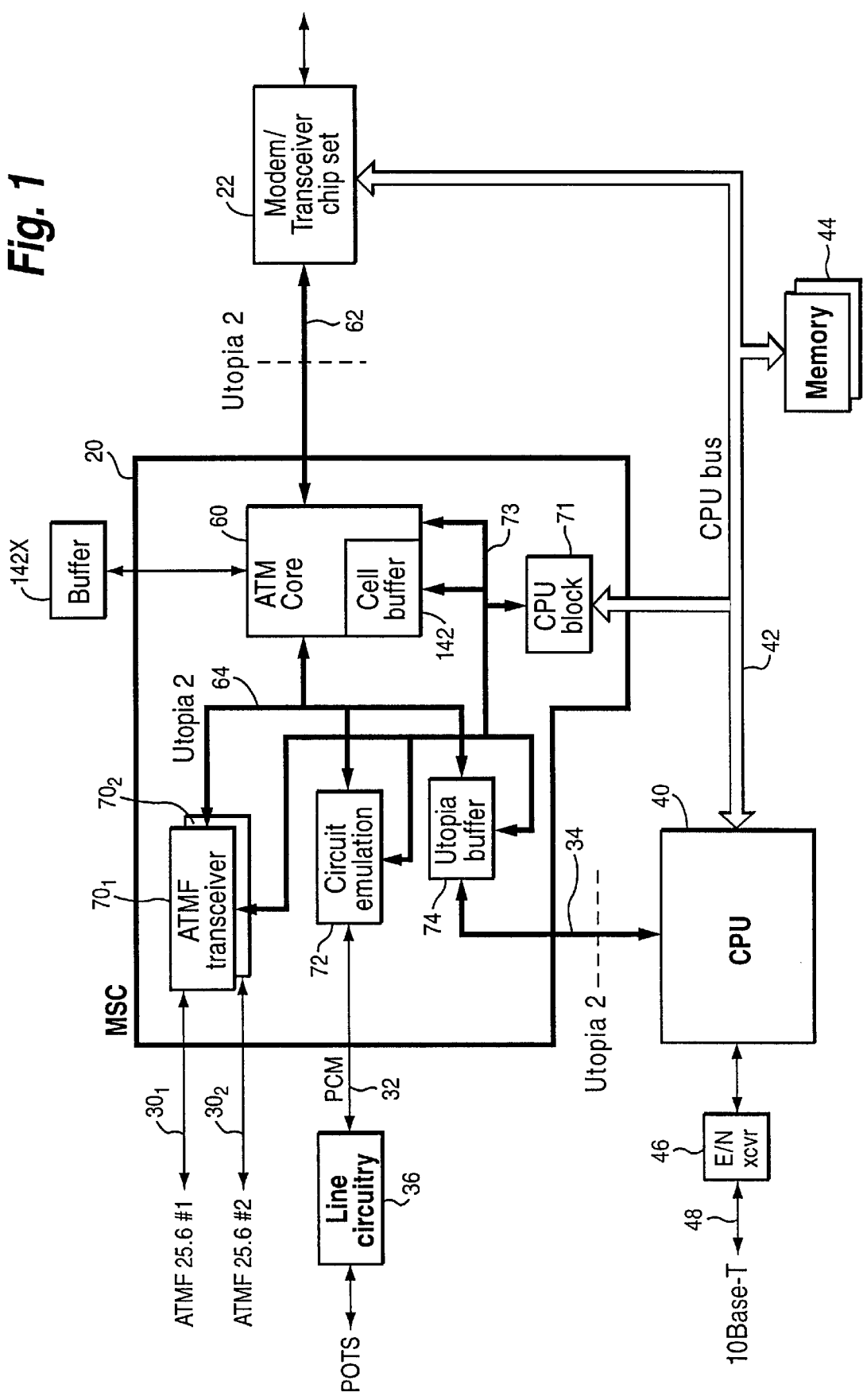
FIG. 1 is a schematic view of a multi-service circuit according to an embodiment of the invention.

FIG. 1 shows a multi-service circuit 20 which connects to a modem/transceiver chip set 22 and distributes data, encapsulated in ATM cells, to and from different service interfaces. The particular service interfaces to and from which multi-service circuit 20 distributes data include interfaces $30_1$ and $30_2$ (which are both ATMF 25.6 interfaces), interface 32; and interface 34 (a Utopia level 2 interface [slave]). While interface 32 is illustrated as being a PCM interface [e.g., for up to four 64 kbps channels supporting four POTS or one IDSN service through line circuitry 36], interface 32 can alternately be a E1/T1 interface.

Multi-service circuit 20 can be utilized, for example, in a network terminal (NT) for distributing and interfacing with services in a multi-service environment, such as HFC, for example. Multi-service circuit 20 is not limited to application for HFC, but is also useful for other types of networks such as xDSL and FTTH.

Multi-service circuit 20 functions in dependence upon a central processing unit (CPU) 40 to which multi-service circuit 20 is connected by CPU bus 42. CPU bus 42 is also connected to memory unit 44 and to modem/transceiver 22. CPU bus 42 carries the signals shown in Table 6. CPU 40 is connected via an ethernet (E/N) transceiver 46 to a physical 10 Mbps interface 48 over a twisted pair cable.

Internally, multi-service circuit 20 comprises an ATM multiplexing/demultiplexing unit known as ATM core 60, which is further described below with respect to FIG. 2. ATM core 60 is connected by modem/transceiver interface 62 on its "aggregate" side; and by services interface 64 on its "tributary" side. Both modem/transceiver interface 62 and services interface 64 are Utopia 2 level interfaces. Modem/transceiver interface 62, having signals described in Table 2, is a master interface which makes modem/transceiver 22 independent. Services interface 64 is an internal Utopia interface, and is defined by ATM Forum, Utopia Level 2.

Services interface 64 connects ATM core 60 to four service devices. ATM core 60 represents the ATM layer and the service devices represent the physical layer. In particular, services interface 64 connects ATM core 60 to each of two ATMF transceivers $70_1$, $70_2$; circuit emulation device 72; and utopia buffer 74. ATMF transceiver $70_1$ is connected to ATMF interface $30_1$; ATMF transceiver $70_2$ is connected to ATMF interface $30_2$. ATMF interfaces $30_1$ and $30_2$ carry the signals shown in Table 4. Circuit emulation device 72 is connected to interface 32; utopia buffer 74 is connected to interface 34. Interface 32 carries the signals shown in Table 3; interface 34 carries the signals shown in Table 5.

Multi-service circuit 20 includes a CPU block 71 through which ATM core 60 is connected to CPU bus 42 and ultimately to CPU 40. An internal CPU bus 73 connects CPU block 71 to ATM core 60, as well as to the service devices $70_1$, $70_2$, 72, and 74. Only services interface 64 connects ATM core 60 to the service devices $70_1$, $70_2$, 72, and 74.

2.0 ATM Core

Figure 2:
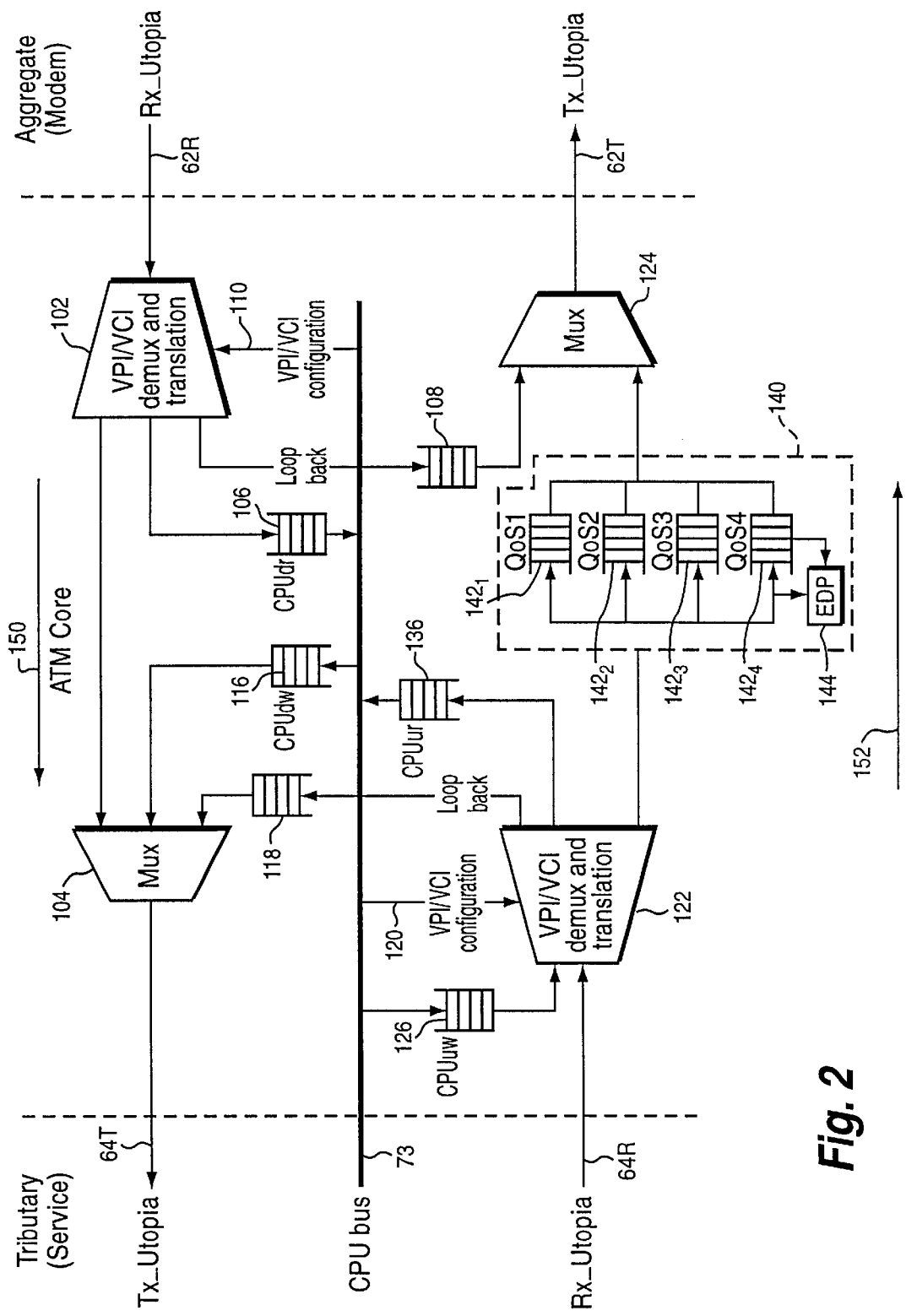
FIG. 2 is a schematic view of an ATM core included in the multi-service circuit of FIG. 1.

FIG. 2 shows generally the structure of ATM core 60. In FIG. 2, internal CPU bus 73 serves to divide ATM core 60 into a downstream side (above bus 73 in FIG. 2) and an upstream side (below bus 73 in FIG. 2).

The downstream side of ATM core 60 includes a downstream demultiplexer and translator 102 which has an input terminal connected to the receive portion 62R of modem/transceiver interface 62. Differing output terminals of downstream demultiplexer and translator 102 are connected to a downstream multiplexer 104; downstream read CPU buffer 106; and downstream loop-back buffer 108. The downstream read CPU buffer 106 is connected to internal CPU bus 73. Internal CPU bus 73 is also employed to provide VPI/VCI configuration information to downstream demultiplexer and translator 102 as indicated by line 110.

Downstream multiplexer 104 has differing input terminals connected to an output terminal of downstream demultiplexer and translator 102 as described above, as well as to a set 116 of downstream write CPU buffers and to an upstream loop-back buffer 118. An output terminal of downstream multiplexer 104 is connected to a transmit portion 64T in services interface 64.

The upstream side of ATM core 60 includes an upstream demultiplexer and translator 122 and an upstream multiplexer 124. A first input terminal of upstream demultiplexer and translator 122 is connected to a receive portion 64R of services interface 64. A second input terminal of upstream demultiplexer and translator 122 is connected to upstream write CPU buffer 126. The VPI/VCI tables of upstream demultiplexer and translator 122 are updated by CPU 40 as indicated by line 120. Differing output terminals of upstream demultiplexer and translator 122 are connected to upstream loop-back buffer 118; a set 136 of upstream CPU write buffers; and (via buffer section 140) to upstream multiplexer 124.

A first input terminal of upstream multiplexer 124 is connected to downstream loop-back buffer 108. A second input terminal of upstream multiplexer 124 is connected to outputs of buffer section 140. An output terminal of upstream multiplexer 124 is connected to a transmit portion 62T in modem/transceiver interface 62.

Buffer section 140 includes plural internal queues, e.g., for differing types of service quality. In the illustrated embodiment, buffer section 140 includes first through forth buffers numbered as $142_1$ through $142_4$, respectively. Cells input to buffer section 140 are routed to an appropriate one of the queues $142_1$ through $142_4$ depending, e.g., on their quality of service.

In addition, an early packet discard (EPD) 144 is also provided as part of upstream demultiplexer and translator 122. When a sequence of cells that together form a PDU (Packet Data Unit) is about to be stored in a queue or buffer, it is possible to decide that the complete PDU shall be discarded. Discarding of the complete PDU may be necessary, for example, if the queue or buffer has insufficient space to accommodate the complete PDU. Rather than storing only a part of the PDU, the complete PDU is discarded. The particular illustration of early packet discard (EPD) 144 in FIG. 2, for example, is intended to indicate that a cell which otherwise would be stored in one of the queues $142_1$ through $142_4$ is subject to early packet discard by upstream demultiplexer and translator 122.

As explained in more detail hereinafter, in the downstream direction depicted as arrow 150 in FIG. 2, cells obtained from modem/transceiver 22 are distributed either to one of the service devices $70_1$, $70_2$, 72, and 74 or to downstream read CPU buffer 106. Cells can also be read from set 116 of downstream write CPU buffers and sent to service devices $70_1$, $70_2$, 72, and 74. In the upstream direction depicted as arrow 152 in FIG. 2, ATM core 60 reads ATM cells from service devices $70_1$, $70_2$; 72; and 74 and distributes the cells either to the set 136 of upstream CPU write buffers or to modem/transceiver 22. Cells can also be read from upstream write CPU buffer 126 and sent to modem/transceiver 22.

3.0 Cell Flow 3.1 Downstream Cell Flow

As soon as portion 62R of modem/transceiver interface 62 has a cell available, the cell is read and the VPI/VCI of the incoming cell is examined by downstream demultiplexer and translator 102. In this regard, downstream demultiplexer and translator 102 has VPI/VCI tables which is configured by CPU 40. These VPI/VCI tables are described in more detail with reference to FIG. 17A. Based on the VPI/VCI of the incoming cell, a look up operation is performed in the VPI/VCI tables of downstream demultiplexer and translator 102 to determine both the physical destination of the cell, as well as what new VPI/VCI the cell should have as it leaves ATM core 60.

Figure 2A:
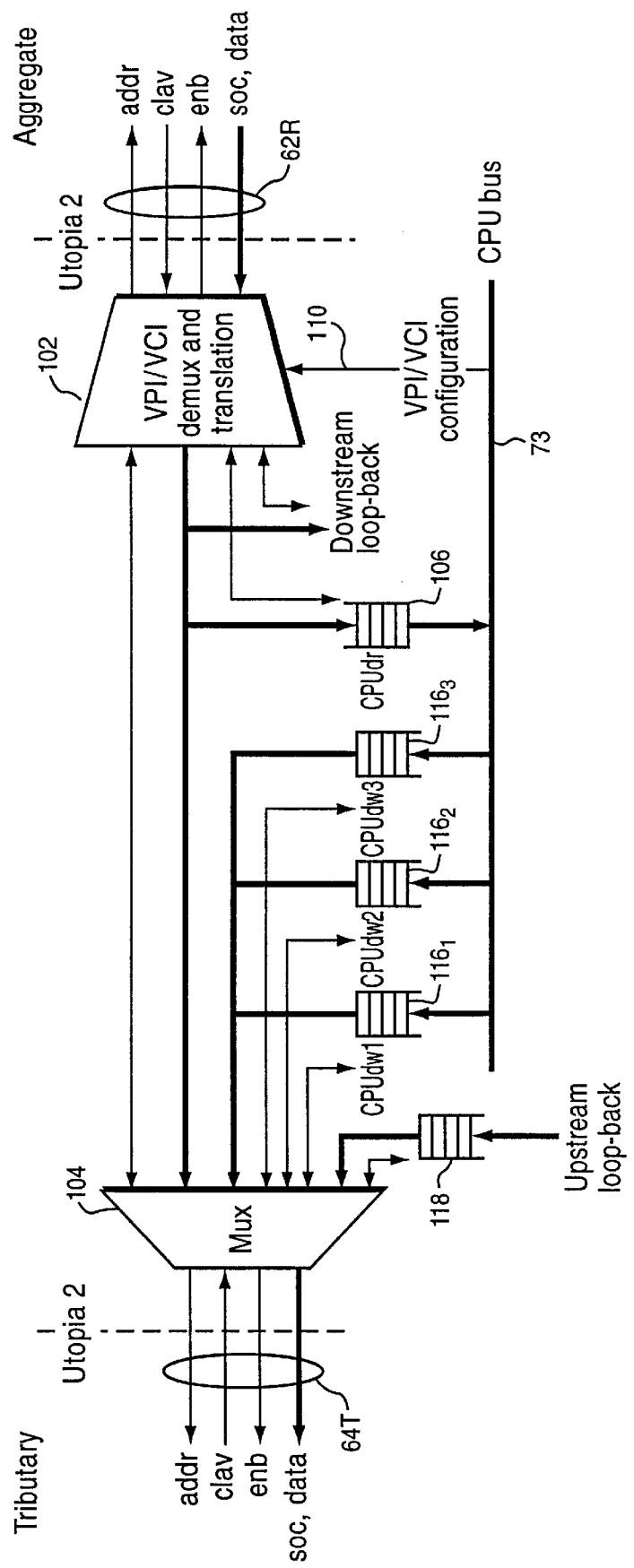
FIG. 2A is a schematic view of a downstream side of the ATM core of FIG. 2.

FIG. 2A shows in more detail a downstream side of ATM core 60, and particularly illustrates more fully the set 116 of downstream write CPU buffers. As shown in FIG. 2A, the set 116 of downstream write CPU buffers includes buffers $116_1$, $116_2$, and $116_3$, each of which have input terminals fed by internal CPU bus 73 and output terminals connected to an input terminal of downstream multiplexer 104. Each of these buffers is associated with one of three of service devices $70_1$, $70_2$, 72, and 74, thereby giving ATM core 60 the ability to send cells from CPU 40 to the three service devices having one of the buffers $116_1$, $116_2$, and $116_3$.

Figure 3A:
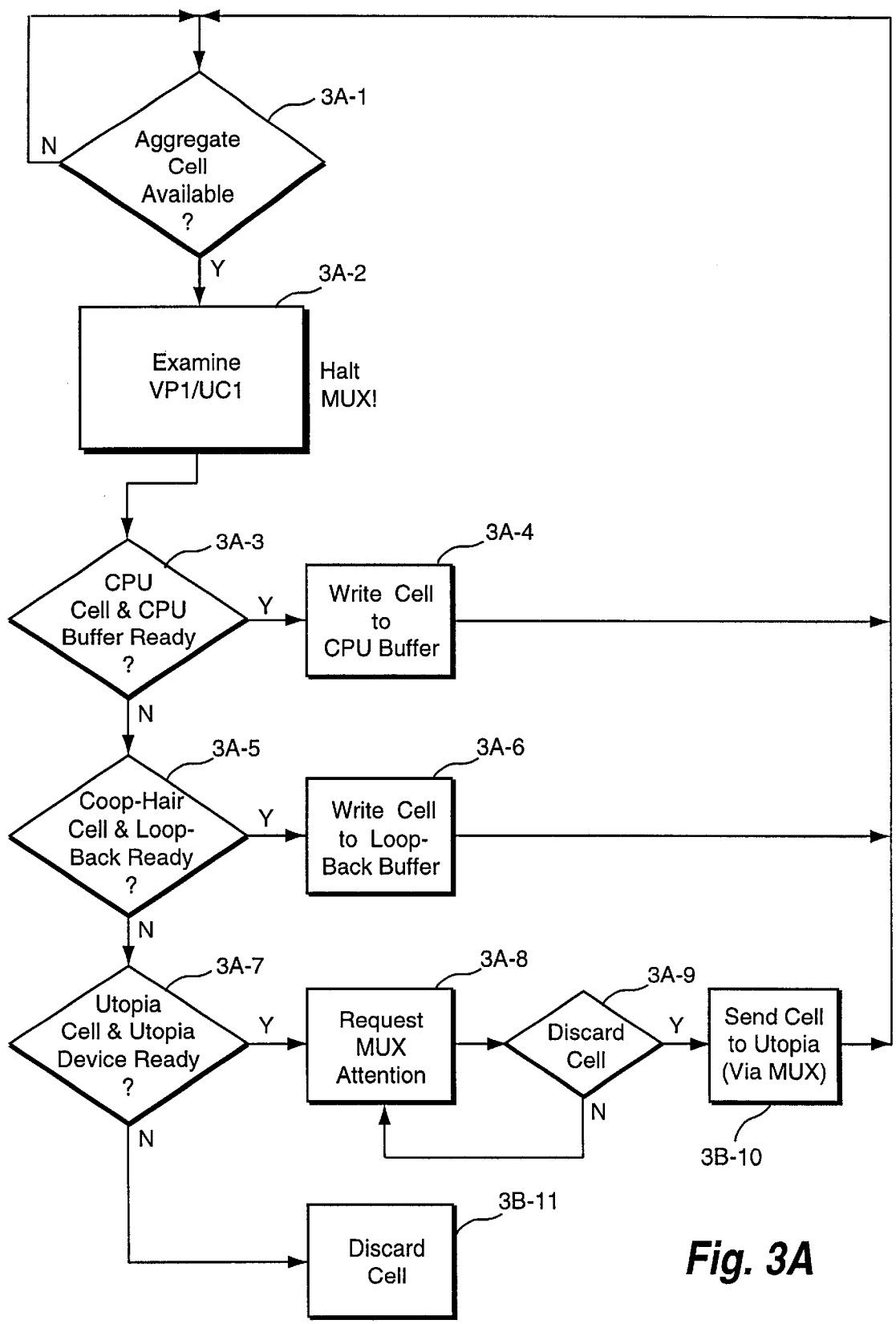
FIG. 3A is a flowchart showing general steps performed by a demultiplexer of the downstream side of the ATM core of FIG. 2.

FIG. 3A, in conjunction with FIG. 2A, shows the general steps performed by downstream demultiplexer 102 in handling a cell incoming from modem/transceiver 22. At step 3A-1 demultiplexer 102 determines whether a cell is available from modem/transceiver 22 on interface 62. Cells available from modem/transceiver 22 on interface 62 are known as "aggregate" cells. Demultiplexer 102 repetitively checks whether an aggregate cell is available, as indicated by the negative branch of decision symbol of step 3A-1. If an aggregate cell is available, at step 3A-2 its VPI/VCI is examined (as described above) and downstream multiplexer 104 is halted. Based on VPI/VCI, downstream demultiplexer and translator 102 knows where the cell is headed e.g., for one of service devices $70_1$, $70_2$, 72, and 74, or for CPU 40 (e.g., downstream read CPU buffer 106), or for downstream loop-back buffer 108. In this regard, see Section 10.1 and FIG. 17A.

After the VPI/VCI of the downstream incoming cell is translated, a check is first made at step 3A-3 whether the cell is headed for CPU 40 and whether downstream read CPU buffer 106 is ready to receive a cell. If the check at step 3A-3 is affirmative, at step 3A-4 the cell is written to downstream read CPU buffer 106.

If the determination at step 3A-3 is negative, a check is made at step 3A-5 whether the cell is headed for downstream loop-back buffer 108, and whether downstream loop-back buffer 108 is ready to accept a cell. If the check at step 3A-5 is affirmative, at step 3A-6 the cell is sent to downstream loop-back buffer 108.

If the determination at step 3A-5 is negative, a check is made at step 3A-7 whether the cell is a Utopia cell (e.g., is headed for one of the service devices $70_1$, $70_2$, 72, and 74) and whether the particular device to which the cell is headed is ready to accept a cell. If the check at step 3A-7 is affirmative, at step 3A-8 the attention of downstream multiplexer 104 is requested. The attention of downstream multiplexer 104 is repetitively requested until it is determined (at step 3A-9) that downstream multipexer 104 is ready. Once downstream multiplexer 104 is ready, at step 3A-10 the cell is sent to downstream multiplexer 104 so that the cell can be sent over the transmit portion 64T of services interface 64 to the particular device to which it is destined.

Regarding the check of step 3A-7, ATM core 60 is continuously updated regarding the buffer status for each of the service devices $70_1$, $70_2$, 72, and 74. In this regard a polling using the Tx_Clav signal over interface 64 provides an indication whether there is sufficient space in the buffer of each device for storing a complete cell.

If the determinations at steps 3A-3, 3A-5, and 3A-7 are all negative, the cell is discarded as indicated by step 3A-11. Upon completion of each of steps 3A-4, 3A-6, 3A-10, and 3A-11, execution continues with the awaiting of processing a new downstream cell at step 3A-1.

Figure 3B:
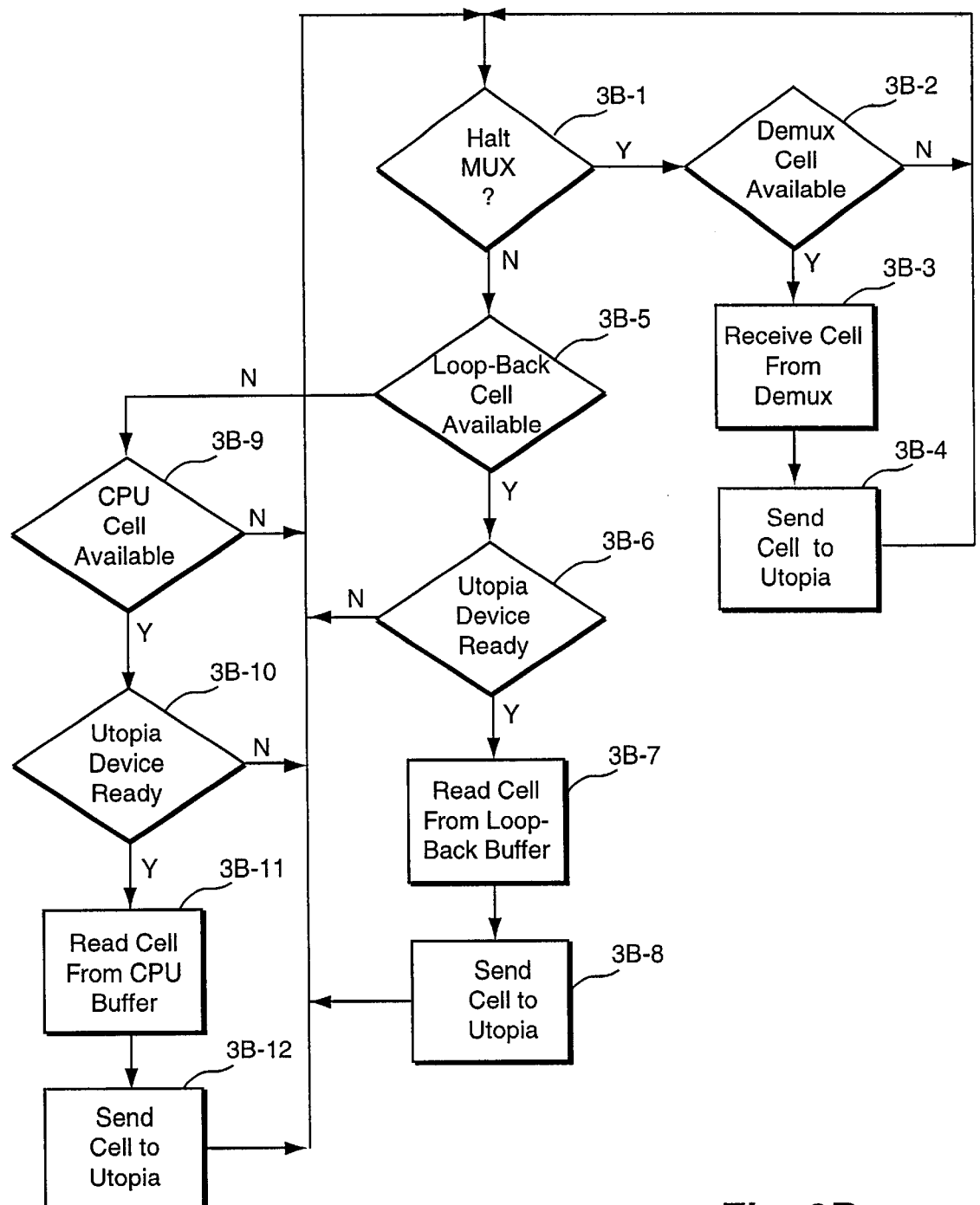
FIG. 3B is a flowchart showing general steps performed by a multiplexer of the downstream side of the ATM core of FIG. 2.

FIG. 3B, in conjunction with FIG. 2A, shows the general steps performed by downstream multiplexer 104. Step 3B-1 shows multiplexer 104 determining whether it has been halted by demultiplexer 102 (see step 3A-2 of FIG. 3A). If multiplexer 104 has been halted, at step 3B-2 a determination is made whether a cell is available from demultiplexer 102. Multiplexer 104 knows that a cell is available from demultiplexer 102 when demultiplexer 102 has requested the attention of multiplexer 104 (see step 3A-8 of FIG. 3A). If a cell is not available from demultiplexer 102, multiplexer 104 loops back to step 3B-1. If a cell is available from demultiplexer 102, at step 3B-3 the multiplexer 104 receives the cell which was sent to it by demultiplexer 102 (see step 3A-10 of FIG. 3A). Then, at step 3B-4, multiplexer 104 gates the cell to the appropriate one of the Utopia devices (service devices $70_1$, $70_2$, 72, and 74) as indicated by the VPI/VCI of the cell. After the gating of the cell, operation loops back to step 3B-1.

If multiplexer 104 has not been halted by demultiplexer 102, at step 3B-5 multiplexer 104 checks whether a loop back cell is available from upstream loop-back buffer 118. If a cell is available from upstream loop-back buffer 118, at step 3B-6 a check is made whether the appropriate Utopia device (one of service devices $70_1$, $70_2$, 72, and 74) to which the cell is destined is ready to accept the cell. If the service device is not ready, operation returns to step 3B-1. If the service device is ready, at step 3B-7 the multiplexer 104 reads the cell from upstream loop-back buffer 118, and at step 3B-8 the cell is gated through multiplexer 104 to the appropriate service device. After the gating of the loop back cell through multiplexer 104 to the appropriate service device, operation loops back to step 3B-1.

If a loop back cell is not available from upstream loop-back buffer 118, at step 3B-9 a determination is made whether a CPU cell is available from one of downstream write CPU buffers 116. If none of the buffers 116 have a cell available, operation loops back to step 3B-1. If one of the buffers 116 does have a cell available, at step 3B-10 a check is made whether the Utopia device (e.g., one of service devices $70_1$, $70_2$, 72, and 74) to which the CPU cell is destined is ready. If the service device is not ready, operation loops back to step 3B-1. If a CPU cell is available, at step 3B-11 the CPU cell is read from the ready one CPU buffers 116. At step 3B-12 multiplexer 104 gates the CPU cell to the appropriate service device, after which operation continues at step 3B-1.

The operations of demultiplexer 102 as described in FIG. 3A and the operation of multiplexer 104 as described in FIG. 3B are such that these devices can handle cells independently at the same time. For example, if demultiplexer 102 is busy reading cells from interface 62 and storing the read cells in downstream loop back buffer 108, multiplexer 104 can read cells from upstream loop-back buffer 118 and send such cells to one of the service devices $70_1$, $70_2$, 72, and 74. Only if cells are going from interface 62 to interface 64 must both demultiplexer 102 and multiplexer 104 work together.

3.2 Upstream Cell Flow

Figure 2B:
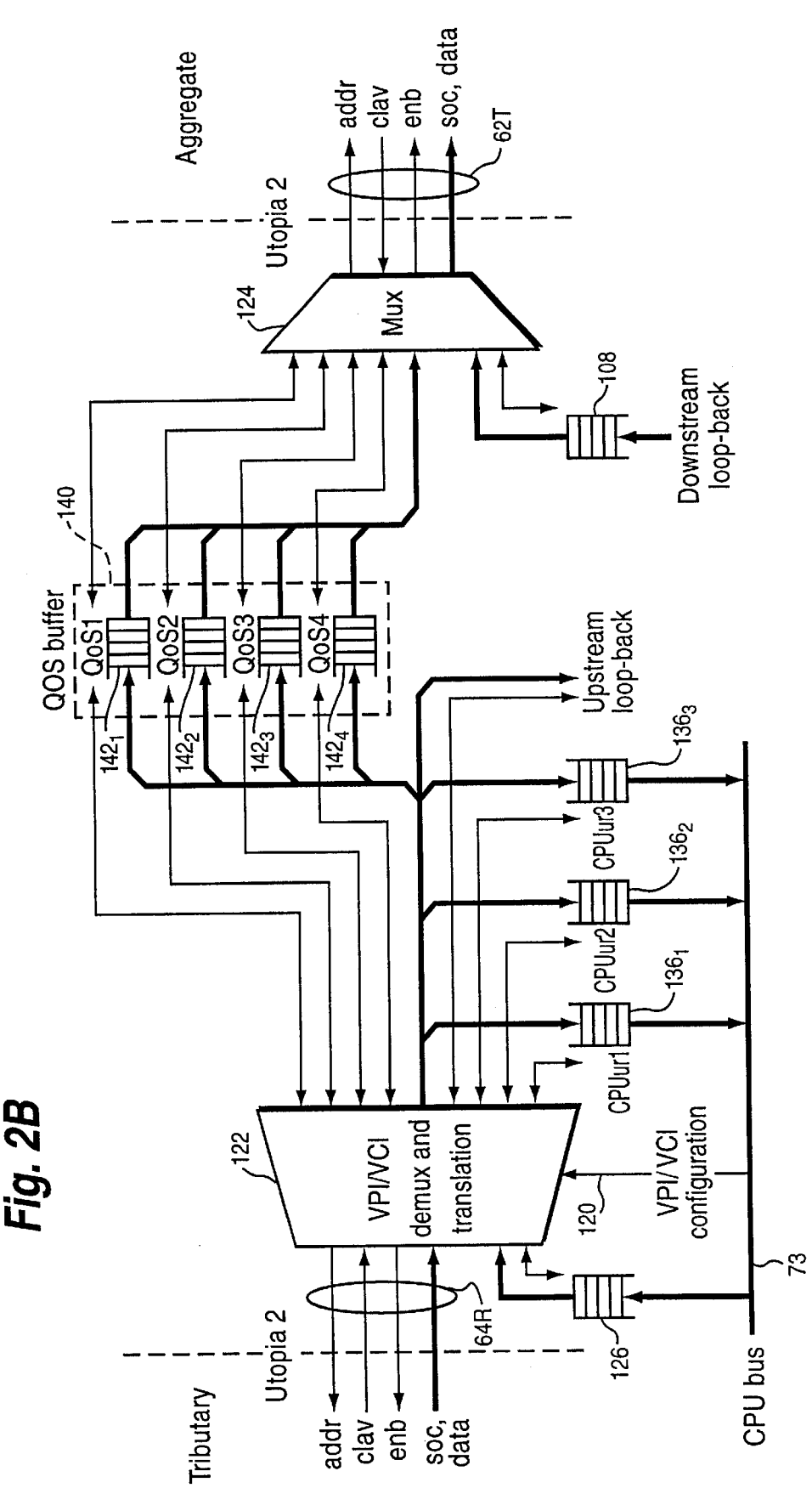
FIG. 2B is a schematic view of an upstream side of the ATM core of FIG. 2.

FIG. 2B shows in more detail an upstream side of ATM core 60, and particularly illustrates more fully the set 136 of upstream CPU write buffers. In particular, the set 136 of upstream CPU write buffers includes buffers $136_1$, $136_2$, and $136_3$. Each of these buffers is associated with one of three service devices $70_1$, $70_2$, 72, and 74, thereby giving ATM core 60 the ability to send cells to CPU 40 from the three service devices having one of the buffers $136_1$, $136_2$, and $136_3$.

On the upstream side of ATM core 60, the service devices service devices $70_1$, $70_2$, 72, and 74 on services interface 64 are read as soon as one of them has a cell available. Cell availability is denoted by the Rx_Clav signal specified on interface 64. Besides the services interface 64, upstream write CPU buffer 126 is also read when it contains a complete cell. The service devices and upstream write CPU buffer 126 have the same priority.

In the upstream direction, there are eight possible destinations for incoming upstream cells—the three buffers in set 136 of upstream CPU write buffers, the four buffers in buffer section 140, and upstream loop-back buffer 118. VPI/VCI cannot solely be relied upon to determine the destination of the incoming upstream cells. The fact that two cells from different ATMF channels have the same VPI/VCI means that the physical source (e.g., ATMF interface $70_1$, $70_2$) must also be used to determine the destination. In like manner as downstream demultiplexer and translator 102, upstream demultiplexer and translator 122 has VPI/VCI tables which also includes source information. The VPI/VCI tables of upstream demultiplexer and translator 122 are updated by CPU 40 as indicated by line 120. The VPI/VCI tables of upstream demultiplexer and translator 122 are described in more detail in section 10.2 and FIG. 17B.

Because ATM core 60 quickly reads cells and stores cells in the destination buffers, ATM core 60 can always make sure that the different service devices are read in proper order. In this regard, ATM core 60 works sufficiently quickly that, even when data is received at maximum speed from all service devices, there is no risk that any of the service devices $70_1$, $70_2$, 72, and 74 will be blocked.

Early packet discard can be performed for all ATM connections and for all buffers in buffer section 140. For each VPI/VCI there is information whether early packet discard (EPD) is to be performed or not (in accordance with configuration by CPU 40 at connection set up) and the current EPD status (an internal variable).

Cells in buffer section 140 are multiplexed together with cells from downstream loop-back buffer 108 at upstream multiplexer 124 for application to modem/transceiver interface 62.

On the upstream side of ATM core 60, a cell is obtained as soon as modem/transceiver interface 62 indicates that it is ready to receive a complete cell. When such an indication is received at upstream multiplexer 124, cell(s) in downstream loop-back buffer 108 is given highest priority, and can be connected to any of the four channels on modem/transceiver interface 62. The handling of the buffers in buffer section 140 depends on the mode of ATM core 60. There are three different modes of ATM core 60.

In a first mode of ATM core 60, all four buffers $142_1$–$142_4$ in buffer section 140 are connected to one channel on modem/transceiver interface 62. In this first mode, all four buffers $142_1$–$142_4$ have different priorities.

In a second mode of ATM core 60, two buffers $142_1$–$142_2$ are connected with one channel on modem/transceiver interface 62 and two other buffers $142_3$–$142_4$ are connected with another channel on modem/transceiver interface 62. In this second mode, the two buffers connected with the same channel have different priorities, but they have the same priorities as the two other buffers that are connected to the other channel.

In a third mode of ATM core 60, each of the buffers $142_1$–$142_4$ are connected with a separate (e.g., different) one of the channels on modem/transceiver interface 62. In this third mode, all four buffers $142_1$–$142_4$ have the same priority.

4.0 VPI/VCI Handling

Each ATM connection has two VPI/VCIs—one for the connection on the modem/transceiver interface 62 (e.g., on the aggregate side), and another for the connection to and from service interface 64 (e.g., on the tributary side). Because upstream cells from circuit emulator 72 are created with a fixed VPI/VCI, this fixed VPI/VCI value must be used for the tributary VPI/VCI. The translation of VPI/VCI values using VPI/VCI tables is discussed in section 10.0, as well as FIG. 17A and FIG. 17B. Examples of ATM connections are shown in Table 1.

ATM core 60 can handle a total of 128 simultaneous ATM connections, both VPCs and VCCs. On the aggregate side, all twelve bits of the VPI are used, but only sixteen combinations can be valid simultaneously. The eight most significant bits are used for filtering cells, which is necessary in an HFC application where each NT must have its own VPI. The four least significant bits (sixteen combinations) will determine the VPC/VCC (together with the VCI for VCCs). In an ADSL application, the eight most significant bits can be reset. Only eight bits of the VCI are used (the LSBs). All 256 VCI combinations and the sixteen VPI combinations can be mixed, but only 128 combinations can be valid simultaneously.

On the tributory side, only four bits of the VPI are used (the least significant bits) and only eight bits of the VCI are used (the least significant bits). All combinations can be mixed, but only 128 combinations can be valid simultaneously.

Figure 4A:
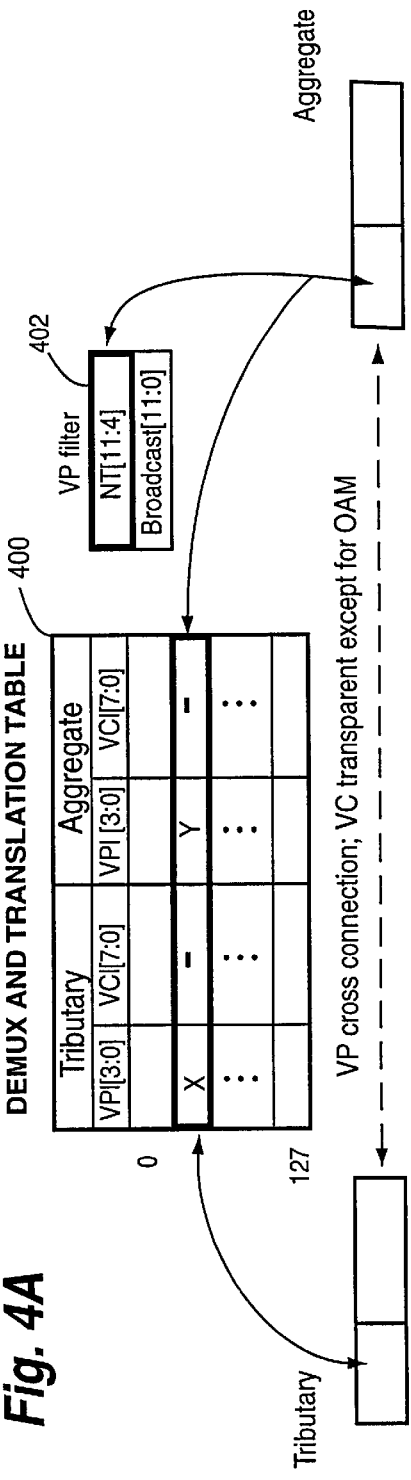
FIG. 4A is a diagrammatic view depicting VP cross connection through the ATM core of FIG. 2.

FIG. 4A shows how a VP cross connection can be set up through ATM Core 60. FIG. 4A includes a demux and translation table 400 which is stored in a set of internal RAMs in ATM core 60 and which are maintained by CPU 40. Any of the 128 connections through ATM core 60 can be configured as VP cross connections (VPC), with sixteen of such connections being configured simultaneously as VPC. In that case the 4 LSB's of the VPI is translated. The 8 MSBs at the aggregate side must correspond to the VP filter, and at the tributary side they are reset, i.e. no generic flow control (GFC) handling is supported. All VC's belonging to a VPC are transparent except for OAM: Segment and end-to-end F4 flows are sorted out and send to CPU 40.

Figure 4B:
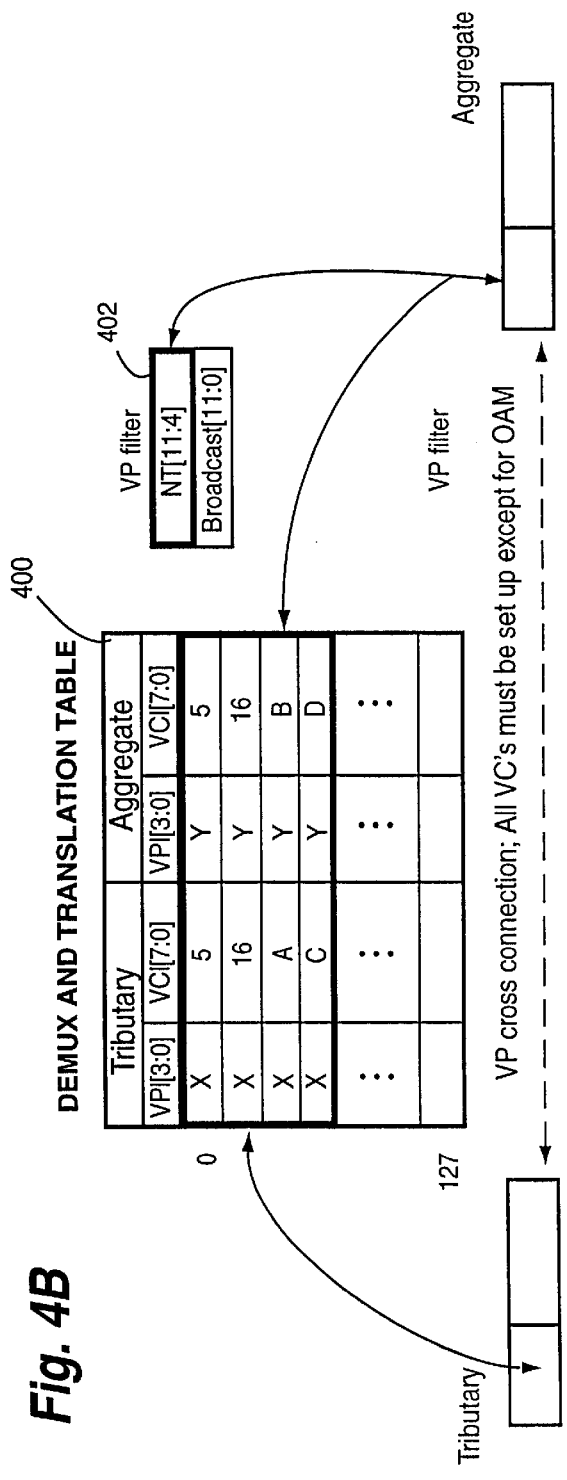
FIG. 4B is a diagrammatic view depicting VC cross connection through the ATM core of FIG. 2.

FIG. 4B shows how VC cross connections can be set up through ATM core 60. All 128 simultaneous connections through the ATM core 60 be configured as VC cross connections (VCC). Using VCC handling means that only VC's that are defined in the demux- and translation table are distributed through ATM core 60, including pre-defined signalling VC's (VC=5 for ITU and VC=16 for ATM Forum as shown in FIG. 4B). The 8 MSBs of the VCI must be 0. Both the 4 LSBs of the VPI and the 8 LSBs of the VCI are translated. The 8 MSBs of the VPI are handled as for VP cross connections. Segment and end-to-end F4 OAM cells are sorted out per VP, just like for VPCs. However, segment F5 cells are sorted out per VC. Those cells are send to CPU 40.

In an HFC application, ability to broadcast cells is needed. This is provided with a separate VPI register 402 as shown in FIG. 4A and FIG. 4B. Downstream cells with a VPI that corresponds to this register will be send to the CPU.

5.0 Buffering

Quality of service (QoS) handling is handled only for the upstream flow. All cells that are read from the services interface 64 (and set 136 of upstream CPU write buffers) and are heading for upstream transportation (the direction of arrow 152 in FIG. 2) are stored in the buffer section 140.

Figure 5:
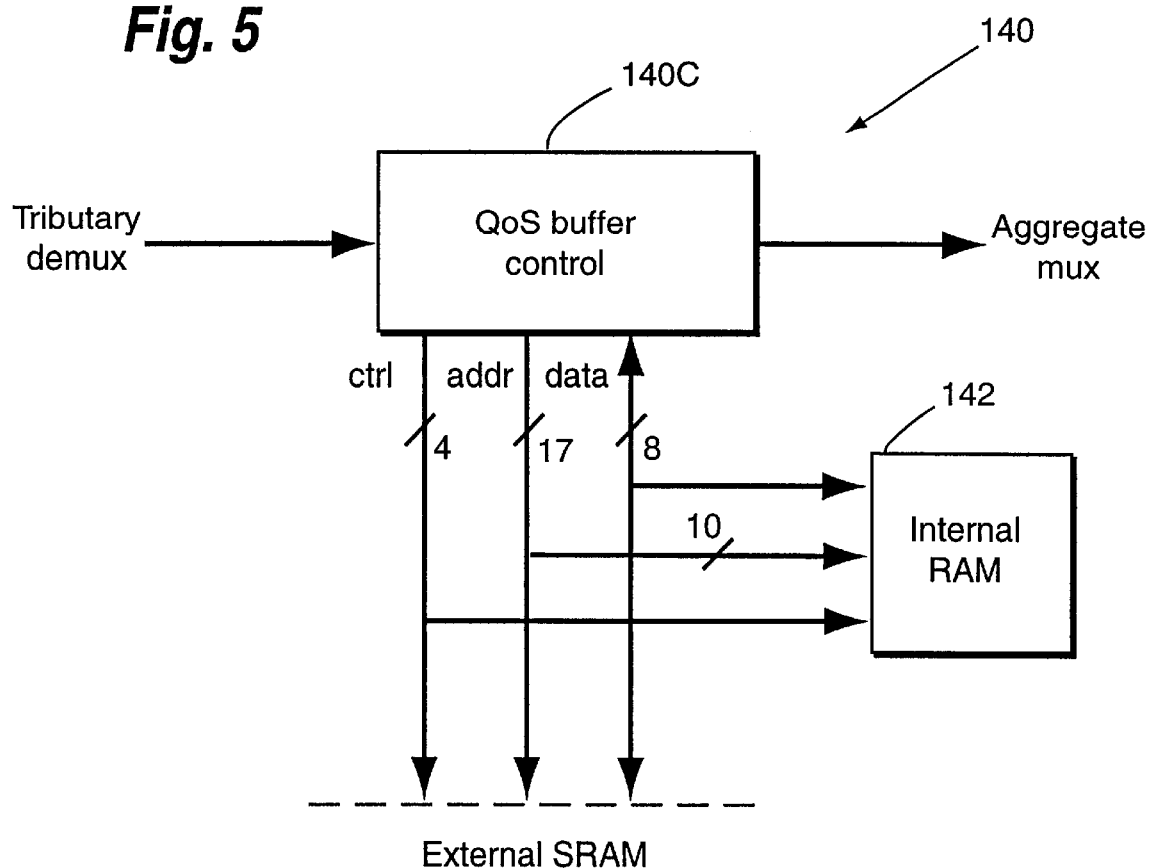
FIG. 5 is a schematic view of a buffer section included in the ATM core of FIG. 2.

Buffer section 140 of multi-service circuit 20 is shown in more detail in FIG. 5. Buffer section 140 actually comprises a buffer controller 140C which is connected between upstream demultiplexer and translator 122 (the tributary mux) and upstream multiplexer 124 (the aggregate mux). Buffer controller 140C supervises data retrieval and storage either in internal memory (e.g., RAM 142) or in an external memory (e.g., SRAM 142X shown in FIG. 1). For example, the buffers $142_1$–$142_4$ shown in FIG. 2 and FIG. 2B can be included in internal memory (e.g., RAM 142). Whether buffers $142_1$–$142_4$ are included in internal memory or external memory is specified and allocated by CPU 40 at start up.

Thus, multi-service circuit 20 has a limited internal buffering capacity, indicated by the four queues $142_1$–$142_4$. In the illustrated embodiment, the size of the internal memory is 2048×8. The size of external SRAM 142X is much larger, e.g., 128K×8.

Figure 5A:
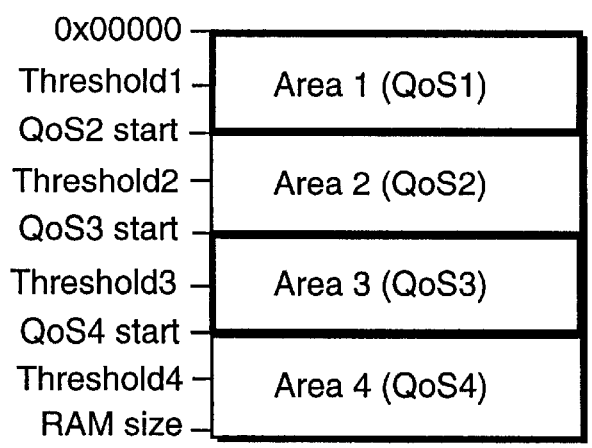
FIG. 5A is a diagrammatic view of a memory map of a buffer section included in the ATM core of FIG. 2.

As shown in FIG. 5A, either internal memory 142 or external memory 142X is divided into 4 areas. As explained above, these four areas can correspond in some modes of the invention to differing cell classes. The first area (Area 1) always starts at address 0x0000, with Area 2–Area 4 being subsequently provided. The size of all areas is programmable, including the EPD threshold values for all areas. As mentioned above, in view of differing operating modes, the four buffer areas Area 1–Area 4 need not necessary correspond to four different QoS classes. Two constant bit rate (CBR) cells can be stored in different buffer areas if one is more timing critical than the other. This is decided at set up for each ATM connection.

6.0 Circuit Emulation Device

Circuit emulation (CE) device 72 performs conversion between ATM and synchronous telephony traffic. In the upstream direction (see arrow 152 in FIG. 2), circuit emulation (CE) device 72 packetizes the synchronous timeslot traffic from the PCM interface into ATM cells via AAL1 (adaptation layer 1). The cells are put onto the services interface 64 for further upstream transportation. In the downstream direction (see arrow 150 in FIG. 2), incoming ATM cells from services interface 64 are unpacketized and the timeslot traffic is reconstructed, this is also done via AAL1.

One context of circuit emulation (CE) device 72 is shown in FIG. 6, wherein circuit emulation (CE) device 72 is connected between services interface 64 and PCM interface 32. Line circuitry 36 (see FIG. 1) includes a dual subscriber line audio circuit (DSLAC) which connects to several subscriber line interface circuits (SLICs). A SLAC is a circuit that takes care of PCM modulation, and is also referred to as a CODEC COder/DECoder). A DSLAC has two SLACs in one circuit. A SLIC handles the high voltage and current on the subscriber line.

Figure 6A:
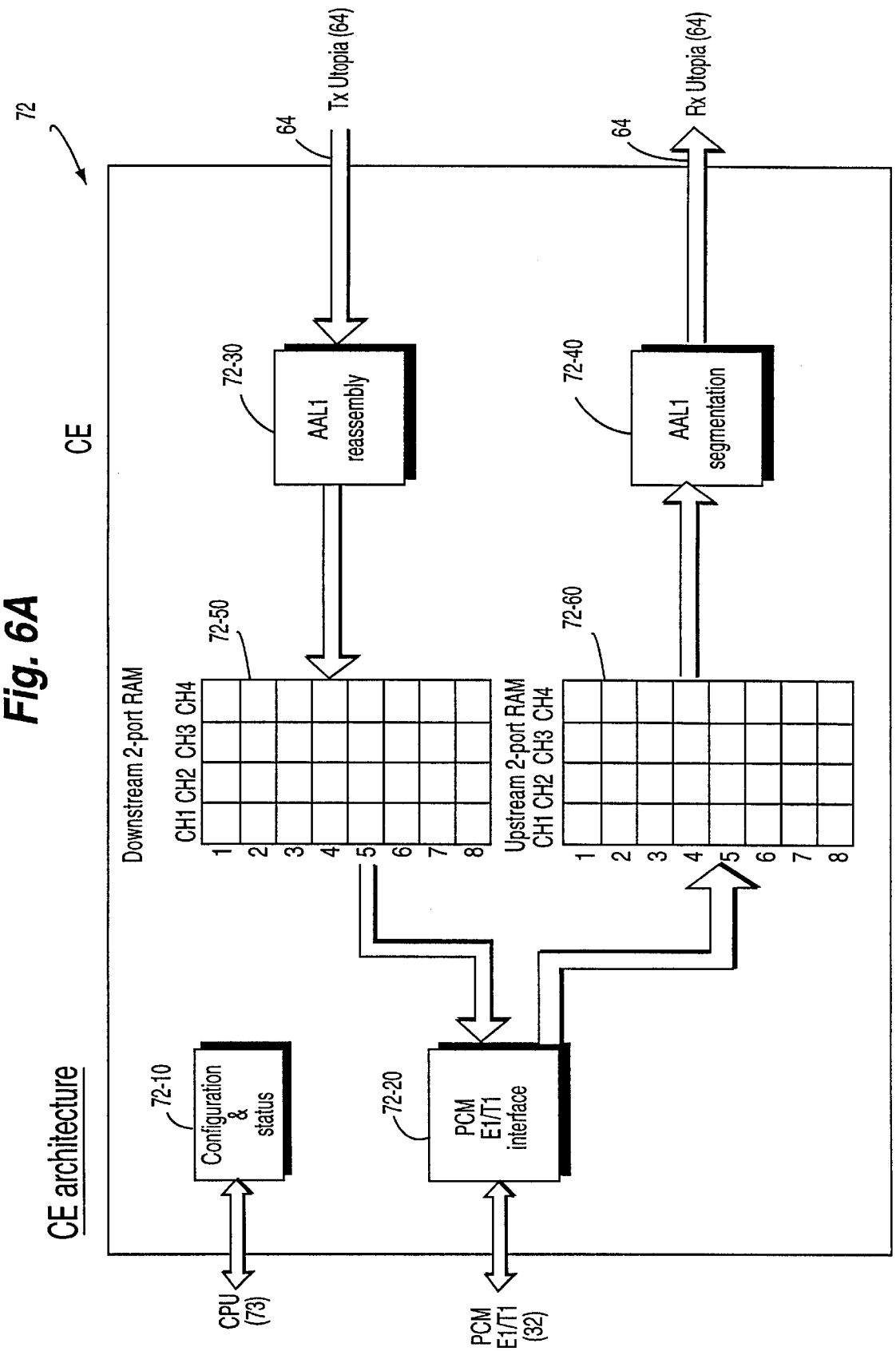
FIG. 6A is a schematic view of the circuit emulation (CE) device of FIG. 6.

FIG. 6A shows example architecture of circuit emulation (CE) device 72. Circuit emulation (CE) device 72, like all of multi-service circuit 20, is a pure hardware circuit. Circuit emulation (CE) device 72 has a set of configuration and status registers 72-10 which are connected by internal CPU bus 73 to CPU 40. Usage of registers in set 72-10 are described below. Circuit emulation (CE) device 72 has a PCM E1/T1 interface 72-20 which connects to interface 32; a nAAL1 reassembly unit 72-30 which connects to transmit lines in interface 64; and, an AAL1 segmentation unit 72-40 which connects to receive lines in interface 64. Between PCM interface 72-20 and AAL1 reassembly unit 72-30 is a downstream dual port RAM 72-50. Between PCM interface 72-20 and AAL1 segmentation unit 72-40 is an upstream dual port RAM 72-60. Each of the dual port RAMs 72-50 and 72-60 is divided into different areas as hereinafter described.

6.1 Packetization

The telephony data can be packetized into either structured 64 kbps channels or unstructured 2048/1544 kbps channels. Both methods are described below.

6.1.1. Structured 64 kbps channels

For structured 64 kbps channels, the ATM cells will always contain data from only one channel. The cells can either be totally filled (47 octets) as shown in FIG. 6B(1), or partially filled (22 or 11 octets) as shown in FIG. B(2). The benefit with totally filled cells is the high utilization of the bandwidth (100%), and the drawback is the high assembly delay (47×125 ms=5.9 ms). The bandwidth utilization for partially filled cells is lower (47% for 22 octets and 23% for 11 octets), but the assembly delay is also lower (2.8 ms and 1.4 ms respectively).

6.1.2 Unstructured 2048/1544 kpbs channels

Figure 7A:
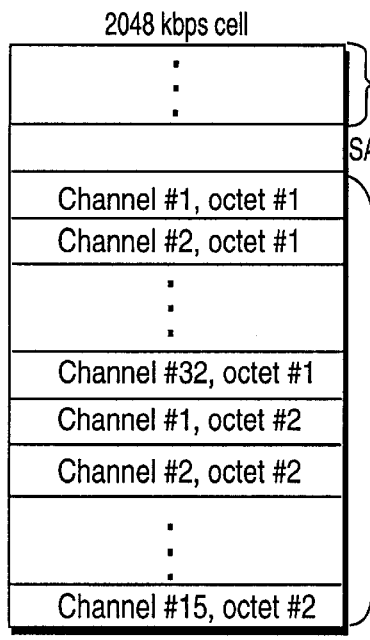
FIG. 7A is a diagrammatic view showing showing cell packetization performed by the circuit emulation (CE) device of FIG. 6, and particularly a cell for E1 transmission.
Figure 7B:
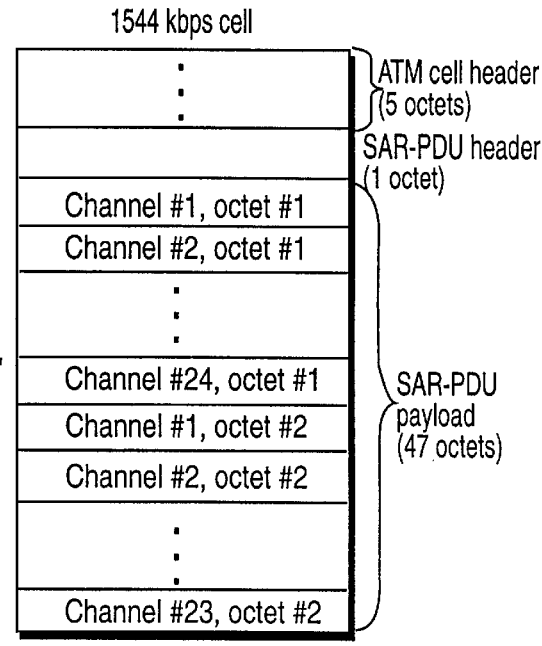
FIG. 7B is a diagrammatic view showing showing cell packetization performed by the circuit emulation (CE) device of FIG. 6 and particularly a cell for T1 transmission.

When using unstructured 2048/1544 kpbs channels, the ATM cells contains data from all channels from either a E1 interface (2048 kbps) [see FIG. 7A] or a T1 interface (1544 kbps) [see FIG. 7B].

6.2 Cell Delay Variation

Figure 8:
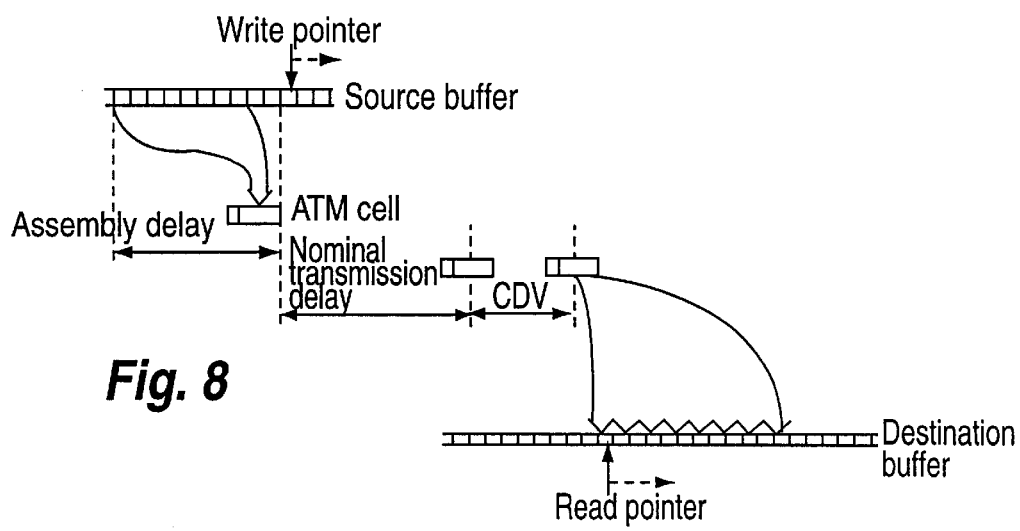
FIG. 8 is a diagrammatic view depicting cell delay variation (CDV) occurring e.g., in the circuit emulation (CE) device of FIG. 6.

The data traveling downstream (e.g., in the direction of arrow 150 in FIG. 2) must be additional delayed in order to handle cell delay variation (CDV). As shown in FIG. 8, there is a nominal transmission delay from the source to the destination. If that delay were constant, the destination could start reading data just after the moment the cells has arrived. However, some cells could be more delayed than others, so the destination must have an extra buffer in the case a cell is very late. Otherwise, there will be buffer underflow. Because of the large assembly delay, not much extra delay can be added for CDV handling. In the illustrated embodiment, circuit emulation (CE) device 72 handles up to 3.9 ms CDV.

6.3 Lost and Misinserted Cells

By looking at the sequence number in the SAR-PDU header, lost and misinserted cells can be detected. When a cell appears with a sequence number that is not in sequence with the previous one, it could be a misinserted cell but it could also be a number of lost cells between this and the previous cell. This can be determined by looking at the sequence number of the next cell. If it is in sequence with the present one, it is considered that some cells have been lost. If it is in sequence with the previous one, the present one is misinserted. A cell which is not in sequence will NOT be stored. If the cell is considered as misinserted (after the next cell has arrived), there is no harm done of not storing the cell. If cells have been lost, the harm is done anyway.

6.4 Synchronization

Because POTS is a synchronous service, it is necessary that a service clock related to the source be recovered, otherwise there will be buffer overflow or underflow. In a synchronous system, the service clock is extracted directly from the network clock (the downstream data clock from the modem). In an asynchronous system, adaptive clock extraction is usually used. However, this method is not suitable for structured circuit emulation because of the delay. Instead a reference clock is provided from the modem, which is used to generate an own clock.

6.5 Segmentation

The data from each POTS channel is typically a constant octet flow with a periodicity of 125 ms. The octets are stored in a buffer -50 in consecutive order. The buffer has 94 octet positions per POTS channel, which covers two cells for totally filled mode (FIG. 9A), 4 cells for 22 octet-partially filled mode (FIG. 9B), and 8 cells for 11 octet-partially filled mode (FIG. 9C).

6.5.1 Segmentation: 64 Kbps Bearer Cells (totally filled)

Figure 9A:
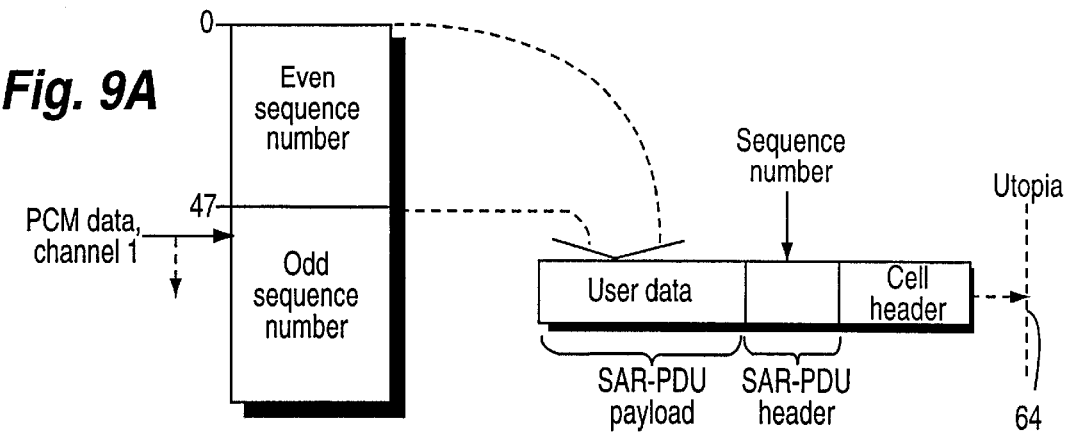
FIG. 9A, FIG. 9B, FIG. 9C, FIG. 9D, and FIG. 9E are diagrammatic views showing mappings of octets in different operating modes into a buffer provided in the circuit emulation (CE) device of FIG. 6.

When the circuit emulation (CE) device 72 is working in a mode of 64 kbps bearer-cells, the buffer is configured to have two areas of 47 octets each (FIG. 9A). Each area represents a cell—the first area (octets 0 to 46) represents cells with even number, the other area (octets 47+) represent cells with odd number. CPU 40 controls the start of each channel by setting a dedicated bit in the configuration register. Channels that are using single 64 kbps bearer are initialized independently of each other. As soon as one area has been filled with data from the PCM interface, a cell can be created and sent upstream. Because there is no extra cell buffer, the cell is not created until the device that controls the Utopia interface 64, i.e., the ATM core 60, requests a cell. ATM core 60 requests a cell shortly after it has received an indication that a cell is ready which really means that a cell is ready to be created. When a cell is created the 47 octets of PCM data are put into the SAR-PDU payload, and a sequence number is put into the SAR-PDU header.

6.5.2 Segmentation: 64 kbps Bearer Cells (22 Octets)

Figure 9B:
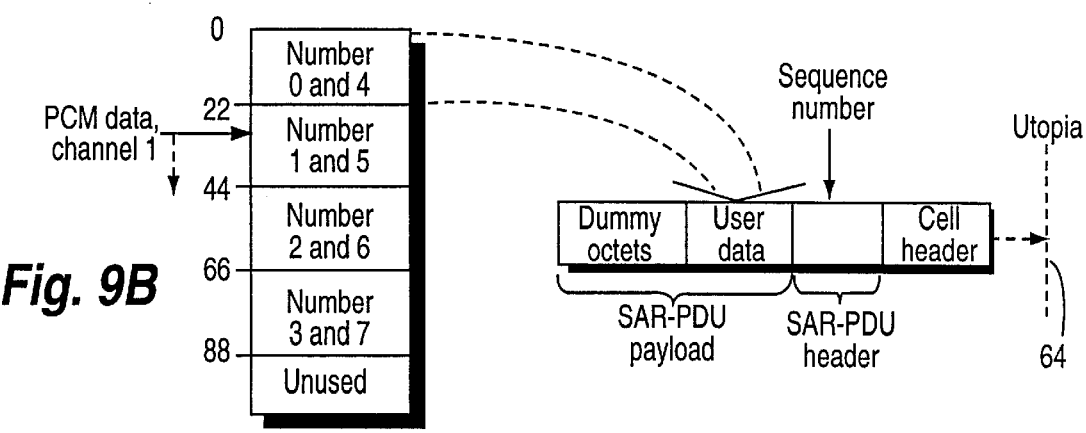
Figure 9C:
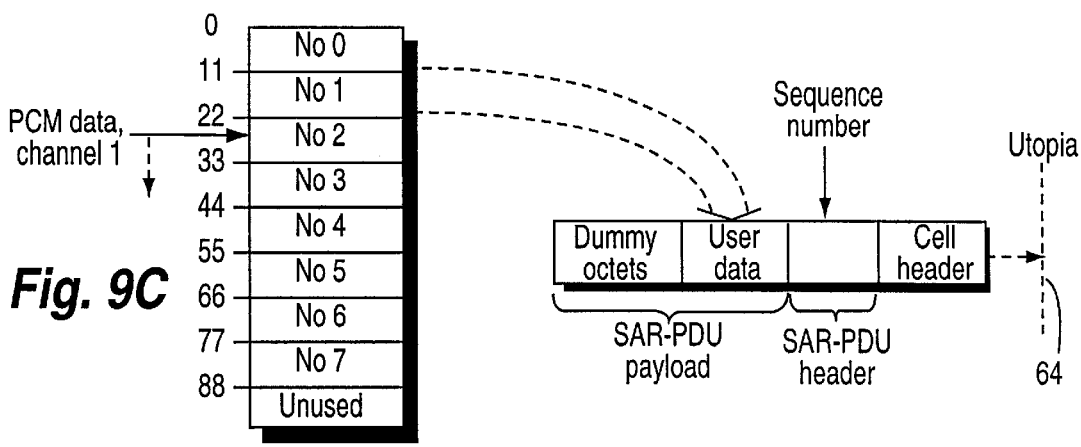

When 64 kbps bearer-cells, partially filled with 22 octets, are employed, the buffer is configured to have 4 areas of 22 octets each (FIG. 9B). As in the preceding discussion each area (e.g., Area 1–Area 4) represents one cell: the first area (octets 0–21) represents cells with sequence number 0 and 4, the second area (octets 22–43) represents cells with sequence number 1 and 5, the third area (octets 44–65) represents cells with sequence represents number 2 and 6, and the fourth area (octets 66–87) represents cells with sequence represents number 3 and 7. Even here the CPU is enabling the start of the writing into the buffer. When a cell area is filled with data (22 octets), indication is given that a cell can be created. A cell is created in the same way as described above, but only 22 octets are put into the SAR-PDU payload. The remaining 25 octets are dummy octets.

6.5.3 Segmentation: 64 kbps bearer Cells (11 Octets)

Figure 9D:
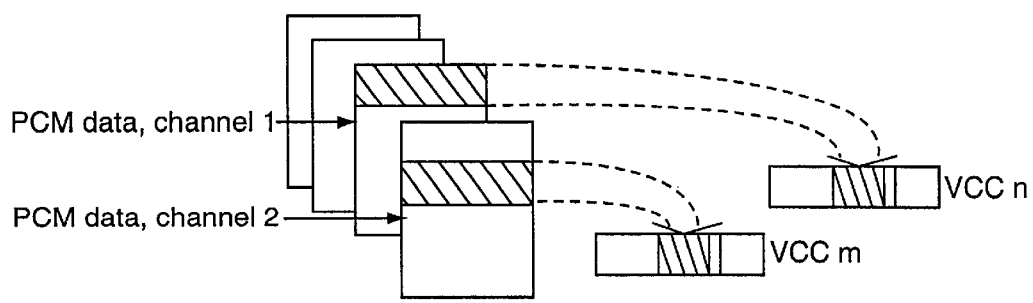

When 64 kbps bearer-cells, partially filled with 11 octets, are employed, the buffer is configured to have 8 areas of 11 octets each. As in the previous modes, each area represents a cell. But in this scenario each sequence number has a unique area. The CPU enables the start of the buffer writing, even though this is not very critical because of the low assembly delay. The creation of a cell is similar to the next previously discussed mode, except that the number of dummy octets (36) differs 6.5.4 Handling of several simultaneous single 64 kbps bearer In order to handle two 64 kbps channels simultaneously, the 94-octet buffer must be doubled as shown in FIG. 9D. For the part that takes care of the writing into the buffers, this will not make any difference. Each channel is stored independently of each other. For the part that takes care of the cell creation, each buffer is treated as a different cell flow (which it is). When a cell for channel 1 is ready to be created, this is indicated to services interface 64 on a separate signal. For channel 2, indication is given on another signal. The services interface 64 requests a cell from the two channels separately. For 4 channels a buffer of 4×94 octets are needed, as shown in FIG. 9D.

6.5.5. Packetizing of unstructured E1/T1 frames

Figure 9E:
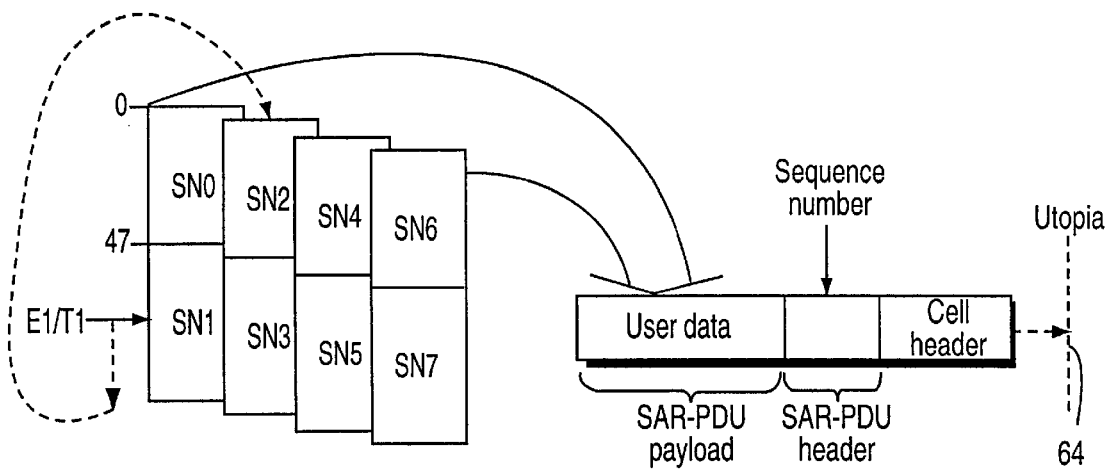

E1 (2048 kbps) and T1 (1544 kbps) frames are transported unstructured over ATM, i.e. the data is packetized into totally filled cells without any handling of separate 64 kbps channels. Because of the serial interface, there is no need for any alignment of the data. In this mode the buffer is configured according to FIG. 9E. In this mode the buffer is filled with data much faster than the n×64 kbps modes, which means that the initialization of the writing is not very critical.

6.6 Reassembly

For the reassembly function, the same respective buffers are defined as for segmentation function. Moreover, the buffers will also have the same configurations as for the respective segmentation functions.

6.6.1 Unpacketizing

Figure 10:
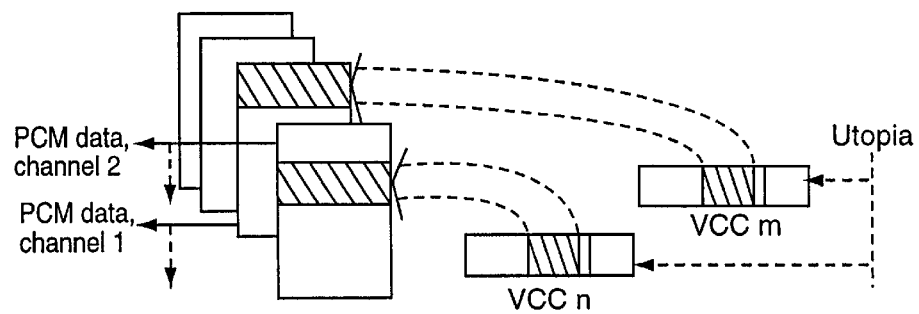
FIG. 10 is a diagrammatic view depicting unpacketizing of two partially filled single 64 kbps bearer cells in the circuit emulation (CE) device of FIG. 6.

The unpacketizing of the different cells follows the same behaviour as for the packetizing. The cells are received from services interface 64. If several single 64 kbps bearers are used, the channels are separated with different enable signals. When a cell is received, the user data is stored in the dedicated area in the buffer (determined by the sequence number). This is also indicated to the read side, so it can see whether data has been written into the area since last time it was read. The buffer is continuously read in a consecutive order, and the data flow is send to the PCM interface 32—one channel per buffer. FIG. 10 shows unpacketizing of two partially filled single 64 kbps bearer-cells.

6.6.2 Handling of Lost and Misinserted Cells

Figure 11:
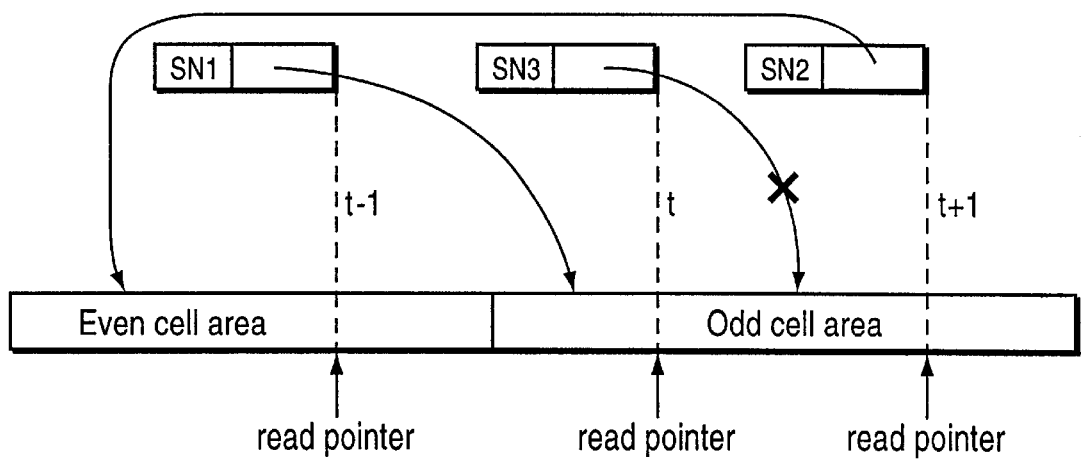
FIG. 11 is a diagrammatic view depicting handling of lost and misinserted cells by the circuit emulation (CE) device of FIG. 6.

When a cell is received at circuit emulation (CE) device 72, the sequence number in the SAR-PDU header is checked. If a cell $C_t$ is not in sequence with the previous cell $C_{t-1}$, it is discarded and the user data is not stored. If the next cell $C_{t+1}$ is in sequence with cell $C_{t-1}$, cell $C_t$ is considered as misinserted and the reassembly procedure continues. If cell $C_{t+1}$ is in sequence with cell $C_t$, it is considered that a number of cells have been lost between cell $C_{t-1}$ and cell $C_t$. Even in this case the reassembly procedure will continue, resulting in that cell $C_t$ is discarded even though it is a correct cell. However, a possible misinserted cell can not be stored because the buffer will only have place for two cells when using totally filled cells. An example is shown in FIG. 11.

If the buffer area for odd cells is being read and a misinserted cell with an odd sequence number arrives $C_t$, the payload must not be stored in the area that is currently being read. Because of the small buffer size, there is no possibility to insert the recommended dummy data into the buffer instead of lost cells. However, each time a cell payload is written into the buffer, this is indicated to the read side. If there is no indication that a cell has been written into an area since last time it was read, the read side will generate the necessary number of dummy bits (1 s).

6.6.3 Handling of Cell Delay Variation (CDV)

If all cells had the same delay through the network, they should appear with a precise periodicity. In that case, the read part could start reading the buffer the moment after the first cell has arrived. In reality, some cells will have more delay (see FIG. 8), which could mean that a buffer area is read before it has been filled with data (buffer underflow). Therefore the read part should be delayed initially when the first cell arrives, so that it will continuously read each cell area a certain time after the cell has been written into it. In that case it will not be buffer underflow if a cell suddenly arrives a little late. The extra CDV delay is programmable by the CPU.

6.7 Synchronization

Figure 12:
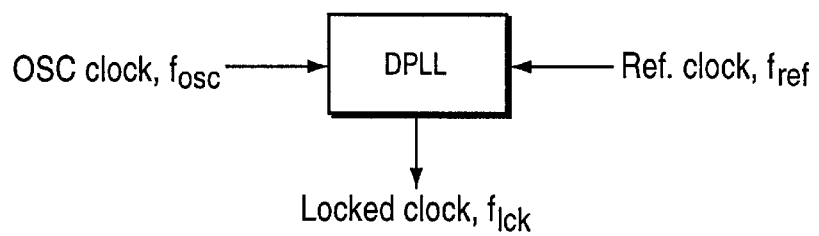
FIG. 12 is a diagrammatic view showing synchronization of downstream data rate by the circuit emulation (CE) device of FIG. 6.

Multi-service circuit 20 needs an 8 kHz network reference clock in order to synchronize the telephony flow. A phase locked loop (DPLL) is used to generate a clock that is locked to the reference clock, as shown in FIG. 12 for synchronization of the downstream data rate. When interface 32 is a PCm interface, the oscillator frequency ($f_{osc}$) must be 32.768 MHz and the generated clock ($f_{lck}$) is 2.048 MHz. This is the same for the E1 interface. However, if the T1 interface is to be used, $f_{osc}$ is 24.704 MHz and $f_{lck}$ is 1.544 MHz. The oscillator is external.

6.8 Interfaces and Clocks

Circuit emulation (CE) device 72 is connected to interface 32, services interface 64, and internal CPU bus 73. Circuit emulation (CE) device 72 is divided into two clock areas. The handling of ATM cells (distribution of data between the buffer and services interface 64 is clocked by the clock that is distributed from the services interface 64 (the system clock). On the other hand, the handling of telephony data (distribution of data between the PCM/E1/T1 interlace and the buffer) is clocked by the DPLL clock (see FIG. 12).

7.0 Utopia Buffer

Figure 13:
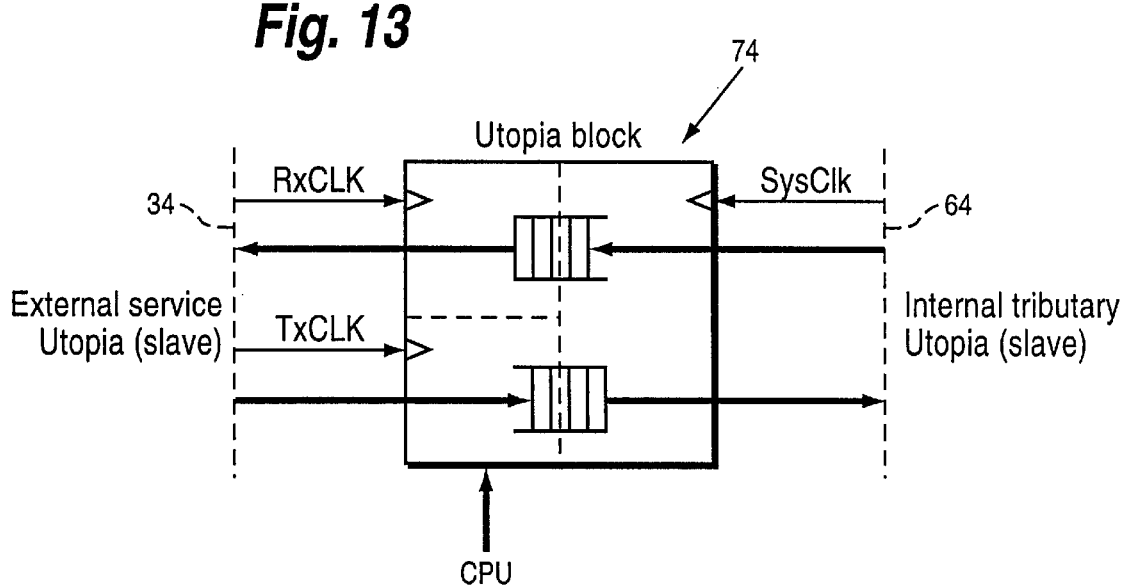
FIG. 13 is a schematic view of a utopia buffer included in the multi-service circuit of FIG. 1.

Utopia buffer 74, shown in FIG. 13, is basically a buffer between services interface 64 (an internal tributary Utopia interface), which is controlled by ATM core 60, and an external service Utopia interface 34 which is controlled by the external device that is connected to it. The internal buffers in utopia buffer 74 can store 2 cells per direction. The external Utopia interface 34 can work in either level 2 or level 1 mode, the mode selection being configured by CPU 40 at start up. In level 2 mode, the physical address must also be configured. Utopia buffer 74 has three different clocks. Distribution of data between utopia buffer 74 and the internal tributary interface (services interface 64) is clocked by the system clock. Distribution of data between utopia buffer 74 and the external Utopia interface 34 is clocked by two separate clocks for transmit and receive, both such clocks being provided from the external Utopia interface 34.

8.0 ATMF 25.6 Transceivers

Figure 14:
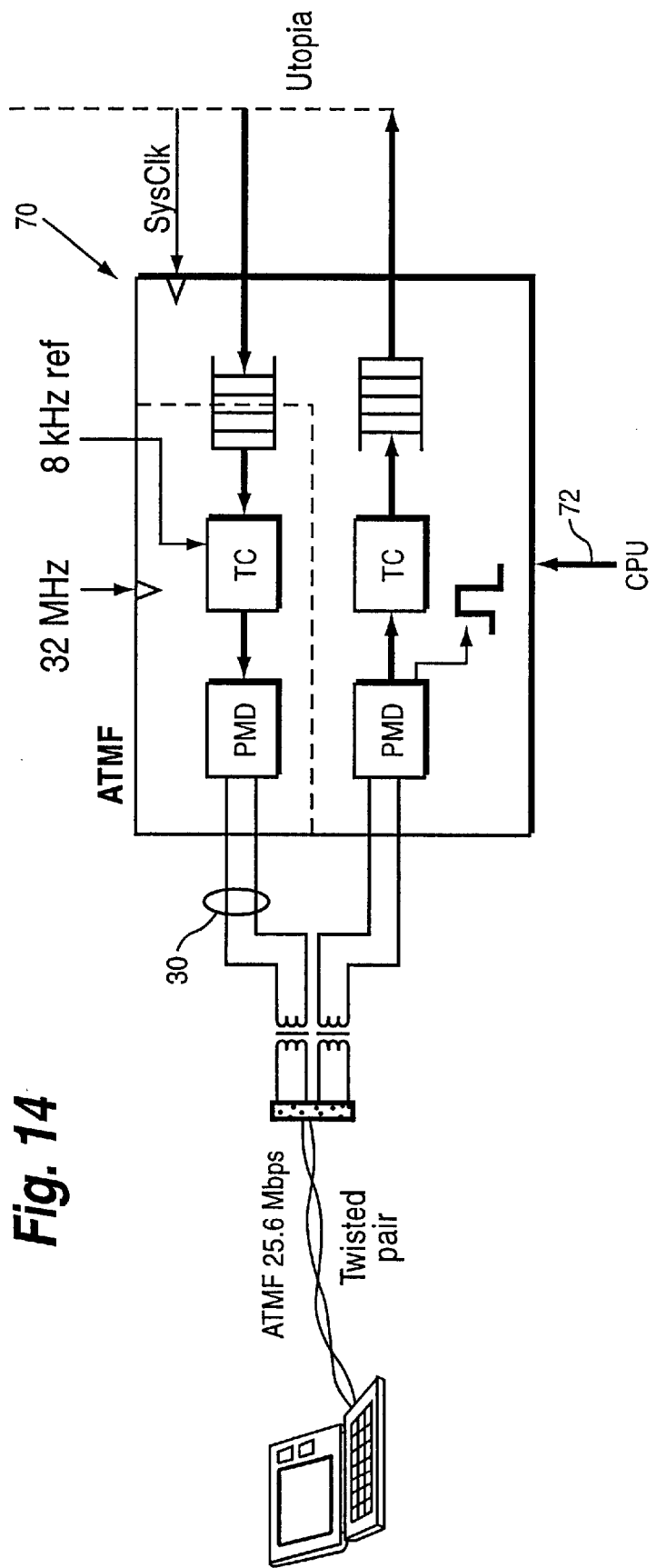
FIG. 14 is schematic view of an ATMF transceiver included in the multi-service circuit of FIG. 1.

ATMF transceivers $70_1$, $70_2$ are each a point-to-point physical ATM interlace for a twisted pair cable, as specified by ATM Forum. The ATMF 25.6 Mbps transceivers $70_1$, $70_2$ are a common standard interface and are provided by computer plug-in cards and set-top-boxes (STB). A representative one of the ATMF transceivers $70_1$, $70_2$ is shown as transceiver 70 in FIG. 14.

In the downstream direction (shown by arrow 150 in FIG. 2), cells are received at ATMF transceivers $70_1$, $70_2$ from the services interface 64 and are transmitted on the 25.6 Mbps lines $30_1$, $30_2$ after having been temporarily stored in a two cells-deep FIFO. In the upstream direction (depicted by arrow 152 in FIG. 2), cells are received from the 25.6 Mbps lines $30_1$, $30_2$ and are stored in a two cells-deep FIFO, where they can be read by the ATM core 60. The functions of the Physical Media Dependent (PMD) sublayer and the Transmission Convergence (TC) sublayer are specified in the ATM 25.6 Mbps Physical Interface Specification from ATM Forum. An 8 kHz reference signal is provided to the downstream part (the same signal as for the DPLL of circuit emulation (CE) device 72), so that timing information can be transmitted over the ATMF interface 30. The downstream clock is distributed from an external 32 MHz oscillator. The upstream clock is extracted from the upstream flow. The handling of cells between the FIFOs and the services interface 64 is clocked by the Utopia clock (the system clock).

9.0 CPU Block

The CPU block 71 distributes data between (1) the external CPU bus 42 and (2) ATM core 60 and service devices $70_1$, $70_2$, 72, and 74. CPU block 71 also handles interrupt. All functions performed by CPU block 71 including the transactions over the internal interface (e.g.. bus 73) are clocked by the system clock.

9.1 Read and Write Handling

Figure 15:
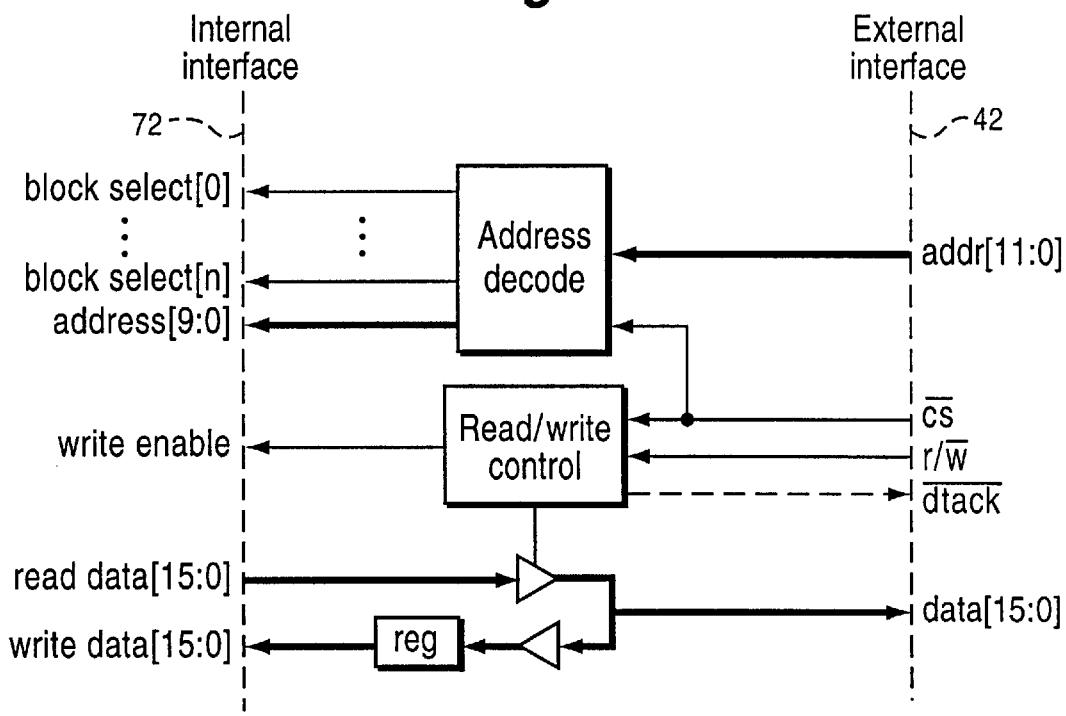
FIG. 15 is diagrammatic view depicting read and write handling performed by a CPU block included in the multi-service circuit of FIG. 1.

Reading and write handling as performed by CPU block 71 are illustrated in FIG. 15. When the CPU 40 performs a read or write action to multi-service circuit 20, the CPU block 71 detects a low transaction on the chip select signal (CS). CPU block 71 then decodes the address bus and distributes the least significant bits of the address bus and a block select signal to the selected block (e.g., ATM core 60 or one of service devices $70_1$, $70_2$, 72, and 74). Bus 73 is a bidirectional data bus which is diverted into two separate buses for read and write. When the internal read or write action has been finished, this is indicated by the data transfer acknowledge signal. Since the read or write action is clocked by the system clock, the timing is dependent on its frequency.

9.2 Interrupt Handling

Figure 16:
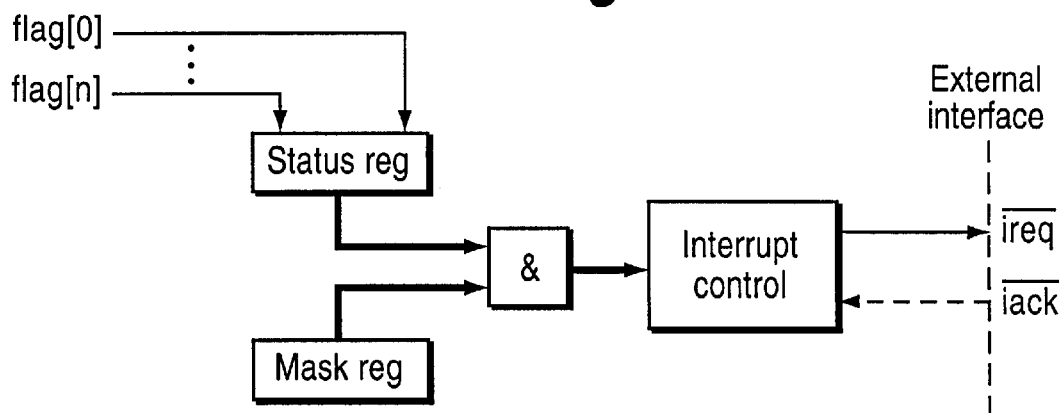
FIG. 16 is diagrammatic view depicting interrupt handling performed by the CPU block included in the multi-service circuit of FIG. 1.

Each block in multi-service circuit 20 gives at least one flag to CPU block 71. The status of each flag is stored in a status register maintained by CPU block 71. A transaction from low to high of a bit in the status register results in an interrupt request (IREQ) to the CPU 40. The interrupt request is deserted when the CPU reads the status register or when the interrupt acknowledge signal (IACK) is asserted. Interrupt request handling can be rejected for each flag by setting a corresponding bit in the mask register. The structure of the interrupt handling is illustrated in FIG. 16.

The following events in multi-service circuit 20 are performed in connection with interrupt handling for the respective flags:

1. A complete cell is stored in the downstream read CPU buffer 106 in ATM core 60 (see FIG. 2A).

2. A complete cell is stored in buffer $136_1$ of the set 136 of upstream CPU read buffers in the ATM core 60 (see FIG. 2B).

3. A complete cell is stored in the in buffer $136_2$ of the set 136 of upstream CPU read buffers in the ATM core 60 (see FIG. 2B).

4. A complete cell is stored in the in buffer $136_3$ of the set 136 of upstream CPU read buffers in the ATM core 60 (see FIG. 2B).

5. An out of sync event or buffer over- or underflow for channel 1 in circuit emulation (CE) device 72

6. An out of sync event or buffer over- or underflow for channel 2 in circuit emulation (CE) device 72

7. An out of sync event or buffer over- or underflow for channel 3 in circuit emulation (CE) device 72

8. An out of sync event or buffer over- or underflow for channel 4 in circuit emulation (CE) device 72

10.0 VPI/VCI Tables of the ATM Core

Figure 17B:
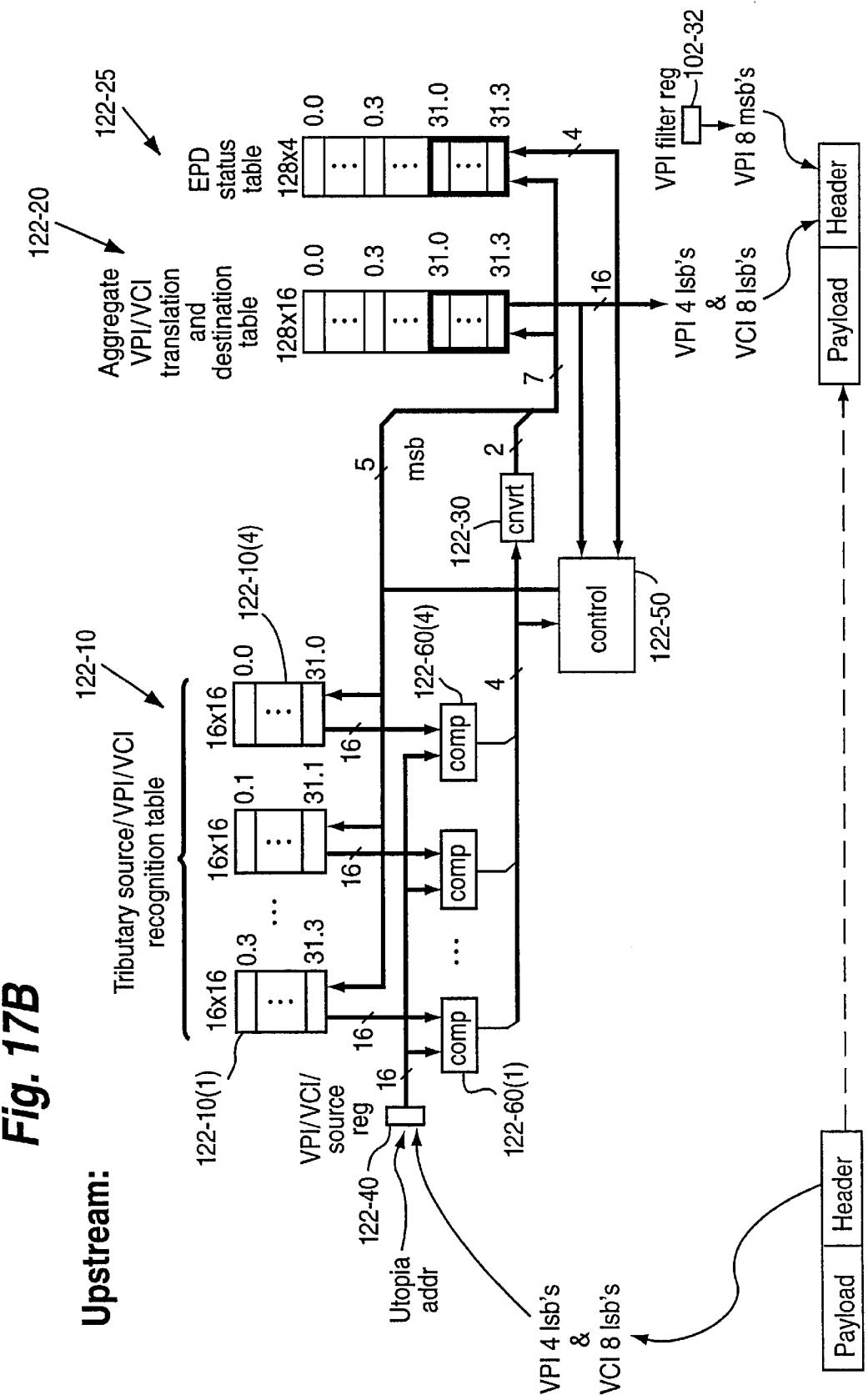

As mentioned above, both demultiplexer and translator 102 and downstream multiplexer 104 utilized VPI/VCI tables configured by CPU 40. The VPI/VCI tables for demultiplexer and translator 102 are illustrated in FIG. 17A; the VPI/VCI tables for downstream multiplexer 104 are illustrated in FIG. 17B.

10.1 VPI/VCI Tables of Downstream Demultiplexer and Translator

As shown in FIG. 17A. demultiplexer and translator 102 has both an aggregate VPI/VCI recognition table 102-10 and an tributary VPI/VCI translation and destination table 102-20. A cell incoming to demultiplexer and translator 102 has certain header information applied both to a validity comparator 102-30 and to a VPI/VCI register 102-40. The certain header information comprises the four least significant bits (LSBs) of the VPI and the eight least significant bits of the VCI of the header. At validity comparator 102-30, the header is compared with a filter value stored in VPI filter register 102-32. If header information is valid, a validity signal is sent to controller 102-50.

An attempt is made by demultiplexer and translator 102 to find a match between the header information stored in VPI/VCI register 102-40 and a value in aggregate VPI/VCI recognition table 102-10. As shown in FIG. 17A, VPI/VCI recognition table 102-10 actually comprises four RAMS 102-10(1) through 102-10(4). An readout port of each of RAMS 102-10(1) through 102-10(4) is connected to a first input port of a corresponding one of comparators 102-60(1) through 102-60(4). A second input port of each of the comparators 102-60(1) through 102-60(4) is connected to receive the value stored in VPI/VCI register 102-40. Each of RAMS 102-10(1) through 102-10(4) has thirty two positions (32×4=128 byte RAMs). When header information is stored in VPI/VCI register 102-40 upon receipt of a new cell by demultiplexer and translator 102, the first position in all four RAMS are checked simultaneously. That is the values in the first positions of the four RAMS are outputted to their corresponding comparators 102-60 to determine if the first position values match the incoming header information. If no match is found, the second positions in all four RAMS are similarly simultaneously checked, and so forth until a match is found. Thus, the maximum time required to search all four RAMS is 32 clock cycles.

When a match is found, an indexing value is determined for addressing tributary VPI/VCI translation and destination table 102-20 and for obtaining therefrom a new header for the cell as it leaves demultiplexer and translator 102. As shown in FIG. 17A, the indexing value has two components. A first component is the address or value used to obtain the matching value from one of the four RAMS. The second component is a 2-bit wide address obtained from a conversion of the four output signals of the four comparators 102-60 upon obtaining the match. The 2-bit wide conversion address is obtained from converter 102-70, which has inputs connected to the outputs of each of the comparators 102-60. The indexing value points to the position of the tributary VPI/VCI translation and destination table 102-20 from which the new header and a destination value can be obtained. The new header for the tributary routing has four bits of VPI and eight bits of VCI. The destination value is a four bit value indicating the tributary Utopia device, or CPU 40, or the downstream loop-back buffer 108.

Thus, as explained above, demultiplexer and translator 102 has a set of integrated RAM tables which are configured by CPU 40. From the perspective of CPU 40, each position in the VPI/VCI table has a unique address. When a position in the VPI/VCI table is found as having a VPI/VCI which matches the VPI/VCI in the incoming cell header, the corresponding position in the VPI/VCI table has the new destination (e.g., one of CPU 40, loop back buffer 108, or the service devices) and the new VPI/VCI.

If the VCI field in the look-up table is reset (VCI=0), this ATM connection is considered to be a VPC, which means that the VCI in the cell header can be any value. In this case only the VPI has to match and the VCI is not translated. The method of using VCI=0 for defining VPCs is feasible since VCI=0 is an undefined value for ATM connections, which means that no cells with VCI=0 will ever appear at multi-service circuit 20. While idle cells and physical OAM have VCI=0, such cells are sorted out at the modem. As an alternative to using VCI=0 to indicate a VPC, VPC status can be indicated by an additional bit in the look up table.

10.2 VPI/VCI Tables of Upstream Multiplexer

As shown in FIG. 17B, upstream demultiplexer and translator 122 has an tributary VPI/VCI recognition table 122-10, an aggregate VPI/VCI translation and destination table 122-20; and an EPD status table 122-25. A cell incoming to upstream demultiplexer and translator 122 has certain header information thereof and a corresponding Utopia address value (4 bits) stored in a VPI/VCI register 122-40. The certain header information comprises the four least significant bits (LSBs) of the VPI and the eight least significant bits of the VCI of the header.

In like fashion with demultiplexer and translator 102, in upstream demultiplexer and translator 122 an attempt is made by to find a match between the header information and Utopia address stored in VPI/VCI register 122-40 and a value in tributary VPI/VCI recognition table 122-10. As shown in FIG. 17B, VPI/VCI recognition table 122-10 comprises four RAMS 122-10(1) through 122-10(4). An readout port of each of RAMS 122-10(1) through 122-10(4) is connected to a first input port of a corresponding one of comparators 122-60(1) through 122-60(4). A second input port of each of the comparators 122-60(1) through 122-60(4) is connected to receive the value stored in VPI/VCI register 122-40. When header information and Utopia address are stored in VPI/VCI register 122-40 upon receipt of a new cell by upstream demultiplexer and translator 122, a matching search is conducted in RAMS 122-10 in the same manner as above described for RAMS 102-10.

When a match is found, an indexing value is determined for addressing aggregate VPI/VCI translation and destination table 122-20 and (when utilized) EPD table 122-25. A new header is obtained from the indexed address of aggregate VPI/VCI translation and destination table 122-20 for the cell which is leaving upstream demultiplexer and translator 122. As with demultiplexer and translator 102, as shown in FIG. 17 the indexing value has two components. A first component is the address or value used to obtain the matching value from one of the four RAMS 122-10. The second component is a 2-bit wide address obtained from a conversion of the four output signals of the four comparators 122-60 upon obtaining the match. The 2-bit wide conversion address is obtained from converter 122-70, which has inputs connected to the outputs of each of the comparators 122-60. The indexing value points to the position of the aggregate VPI/VCI translation and destination table 122-20 from which the new header can be obtained. The new header for the tributary routing has four bits of VPI and eight bits of VCI.

VPI filter register 102-32 is used to insert a new VPI value (the eight most significant bits) into the cell headers before the cells are sent to the aggregate interface. In the downstream flow, only aggregate cells with a VPI (eight most significant bits) that corresponds to the register 102-32 are accepted (except for broadcast cells), and when they are translated the eight most significant bits of the VPI are reset. In the upstream flow, only tributary cells with a VPI (eight most significant bits) equal to zero are accepted, and when they are translated the value of the register 102-32 is inserted in the VPI (eight most significant bits).

For each position (address) in aggregate VPI/VCI translation and destination table 122-20 there is a corresponding position in EPD table 122-25. The EPD table 122-25 contains information per ATM connection. needed to handle EPD. The EPD table 122-25 is used only if an EPD select bit is set in VPI/VCI recognition table 122-10.

11.0 Epilogue

The central part of multi-service circuit 20 is thus ATM core 60. ATM core 60 has integrated loop back buffers, CPU buffers, and quality of service buffers. Advantageously, ATM core 60 is very flexible and has structure and operation which is not dependent upon the kind of service devices that are connected at the tributary Utopia interface, e.g., at services interface 64.

ATM core 60 is an integrated circuit which, in the illustrated embodiment, supports eight channels at services interface 64. For three of these channels, a CPU buffer is provided for each direction. This means that cells can be distributed between CPU 40 and each of these three service devices.

The multi-physical utopia interface provided by services interface 64 accommodates integration of future services (e.g., AAL5 SAR and Ethernet). Moreover, although eight channels are provided in the illustrated embodiment, ATM core 60 is expandable to a greater number (e.g., sixteen channels).

Advantageously, the multi-service circuit 20 of the present invention is an integrated circuit which is substantially entirely hardware-based. As such, multi-service circuit 20 has other advantages compared to processor-based units, such as higher data rate and less power consumption.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, multi-service circuit 20 can be configured so that CPU 40 is included therein.

TABLE 1

Examples of ATM connections through the nT.

| ATM connection | VPI/VCI aggregate side | VPI/VCI tributary side | QOS class |
|---|---|---|---|
| CE channel 1 (VCC) | $VPI_1/43$ | CE1_fix | QoS1 |
| CE channel 2 (VCC) | $VPI_1/44$ | CE2_fix | QoS1 |
| Service Utopia (VCC) | $VPI_1/48$ | 0/35 | QoS2 |
| ATMF#1(VCC) | $VPI_1/55$ | 0/35 | QoS3 |
| ATMF#1 (VPC) | $VPI_2/$— | 1/— | QoS3 |
| ATMF#2 (VCC) | $VPI_1/58$ | 0/35 | QoS3 |
| CPU <–> ATMF#1, F4 segment CAM | — | 0/3 | — |
| CPU <–> ATMF#1, F5 segment CAM | — | 0/35 | — |
| CPU <–> Aggregate, F4 end-to-end CAM | $VPI_1/4$ | — | QoS4 |
| CPU <–> Aggregate, signalling (VCC) | $VPI_1/33$ | — | QoS4 |
| CPU <–> Aggregate, signalling (VPC) | $VPI_2/$— | — | QoS4 |

TABLE 2

Utopia level 2 interface to modem/transceiver

| Signal Name | Type | Width | Description |
|---|---|---|---|
| TX_DATA | Output | 8 | Transmit data. |
| TX_CLK | Output | 1 | Transmit clock. |
| TX_ENB | Output | 1 | Transmit octet enable. |
| TX_SOC | Output | 1 | Transmit start-of-cell. |
| TX_CLAV | Input | 1 | Transmit cell space available. |
| TX_ADDR | Output | 5 | Transmit address. |
| RX_DATA | Input | 8 | Receive data. |
| RX_CLK | Output | 1 | Receive clock. |
| RX_ENB | Output | 1 | Receive octet enable. |
| RX_SOC | Input | 1 | Receive start-of-cell. |
| RX_CLAV | Input | 1 | Receive cell available. |
| RX_ADDR | Output | 5 | Receive address. |

TABLE 3

The PCM and E1/T1 interface

| Signal Name | Type | Width | Description |
|---|---|---|---|
| TxCLK | Output | 1 | Transmit clock, 2048 or 1544 kHz. |
| RxCLK | Input | 1 | Receive clock, 2048 or 1544 kHz. Only for E1/T1. |
| TxD | Output | 1 | Transmit data. |
| RxD | Input | 1 | Receive data. |
| FS | Output | 1 | PCM frame start. |
| DV | Output | 4 | Data valid for each channel. |

TABLE 4

The ATMF interface.

| Signal Name | Type | Width | Description |
|---|---|---|---|
| TxD | Output | 2 | Differential transmit data. |
| RxD | Input | 2 | Differential receive data. |
| EQ | Bidir | 2 | External filter for equalizer. |
| PLL | Bidir | 2 | External filter for PLL. |
| AVCC | Bidir | 4 | Analog power. |
| AGND | Bidir | 4 | Analog ground. |

TABLE 5

The external service Utopia Interface.

| Signal Name | Type | Width | Description |
|---|---|---|---|
| TX_DATA | Input | 8 | Transmit data. |
| TX_CLK | Input | 1 | Transmit clock. |
| TX_ENB | Input | 1 | Transmit octet enable. |
| TX_SOC | Input | 1 | Transmit start-of-cell. |
| TX_CLAV | Output | 1 | Transmit cell space available. |
| TX_ADDR | Input | 5 | Transmit address. |
| RX_DATA | Output | 8 | Receive data. |
| RX_CLK | Input | 1 | Receive clock. |
| RX_ENB | Input | 1 | Receive octet enable. |
| RX_SOC | Output | 1 | Receive start-of-cell. |
| RX_CLAV | Output | 1 | Receive cell available. |
| RX_ADDR | Input | 5 | Receive address. |

TABLE 6

The external CPU interface.

| Signal Name | Type | Width | Description |
|---|---|---|---|
| CS | Input | 1 | Chip select |
| R/W | Input | 1 | Read/write enable |
| ADDR | Input | 12 | Address bus |
| DATA | Bidir | 16 | Data bus |
| IREQ | Output | 1 | Interrupt request |
| DTACK* | Output | 1 | Data transfer acknowledge |
| IACK* | Output | 1 | Interrupt acknowledge |
| OE* | Input | 1 | Output enable |
| BMODE* | Input | 1 | Bus mode (16/8 bits). |
| BSEL* | Input | 1 | Byte select |

What is claimed is:

1. A multi-service circuit which receives ATM cells on an external interface from a modem/transceiver, the multi-service circuit being controlled by a processor, the multi-service circuit comprising:
plural service devices handling differing telecommunication services;
a multiplexer/demultiplexer core connected between the plural service devices and the external interface, the core having:
a downstream side for transmitting cells from the external interface to the service devices and an upstream side for transmitting cells from the service devices to the external interface, the downstream side having a downstream demultiplexer and a downstream multiplexer, the upstream side having an upstream multiplexer and an upstream demultiplexer, a downstream loop-back buffer for storing cells routed from the downstream side to the upstream side;

an upstream loop-back buffer for storing cells routed from the upstream side to the downstream side;

wherein the downstream demultiplexer serves to route cells received from the external interface to one of the downstream loop back buffer, the processor, and an input of the downstream multiplexer;

wherein the downstream multiplexer serves to obtain cells from one of the downstream demultiplexer, the upstream loop-back buffer, and the processor for transmission to the service devices;

wherein the upstream demultiplexer serves to route cells received from the service devices and from the processor to one of the upstream loop-back buffer, the processor, and a buffering section situated between the upstream demultiplexer and the upstream multiplexer; and wherein the upstream multiplexer serves to obtain cells from one of the buffering section and the downstream loop-back buffer so that the cells are forwarded to the external interface.

2. The apparatus of claim 1, wherein the downstream demultiplexer and the downstream multiplexer are capable of independent simultaneous operation except when cells are routed from the downstream demultiplexer to the downstream multiplexer.

3. The apparatus of claim 2, wherein at least one of the service devices is an ATMF transceiver.

4. The apparatus of claim 2, wherein at least one of the service devices is an emulator which interfaces with one of: (1) a PCM interface; (2) a E1 interface; and (3) a T1 interface.

5. The apparatus of claim 4, wherein the emulator has a buffer which is either totally filled or partially filled with data from one channel.

6. The apparatus of claim 4, wherein the emulator has a buffer which is either totally filled or partially filled with data from all channels.

7. The apparatus of claim 2, wherein at least one of the service devices is a Utopia 2 level device.

8. The apparatus of claim 2, wherein the cells are ATM cells.

9. The apparatus of claim 2, a Utopia level 2 tributary interface connects the plural service devices to the multiplexer/demultiplexer core.

10. The apparatus of claim 2, wherein the multi-service circuit is formed as an integrated chip.

11. The apparatus of claim 2, wherein the multi-service circuit is formed entirely by hardware.

* * * * *